US010655961B2

(12) United States Patent
Dormody et al.

(10) Patent No.: US 10,655,961 B2
(45) Date of Patent: May 19, 2020

(54) SYSTEMS AND METHODS FOR DETERMINING AN ALTITUDE ERROR VALUE ASSOCIATED WITH AN ESTIMATED ALTITUDE OF A MOBILE DEVICE

(71) Applicant: NextNav, LLC, Sunnyvale, CA (US)

(72) Inventors: Michael Dormody, San Jose, CA (US); Arun Raghupathy, Bangalore (IN); Andrew Sendonaris, Los Gatos, CA (US)

(73) Assignee: NextNav, LLC, Sunnyvale, CA (US)

( * ) Notice: Subject to any disclaimer, the term of this patent is extended or adjusted under 35 U.S.C. 154(b) by 259 days.

(21) Appl. No.: 15/618,314

(22) Filed: Jun. 9, 2017

(65) Prior Publication Data

US 2017/0276483 A1 Sep. 28, 2017

Related U.S. Application Data

(60) Provisional application No. 62/395,975, filed on Sep. 16, 2016.

(51) Int. Cl.
*G01C 5/06* (2006.01)
*H04W 4/02* (2018.01)

(52) U.S. Cl.
CPC ........................ *G01C 5/06* (2013.01)

(58) Field of Classification Search
CPC ....................................................... G01C 5/06
See application file for complete search history.

(56) References Cited

U.S. PATENT DOCUMENTS

| 6,298,287 | B1 * | 10/2001 | Tazartes | G01C 5/06 |
| | | | | 342/355 |
| 6,522,298 | B1 * | 2/2003 | Burgett | G01C 5/06 |
| | | | | 342/357.25 |
| 6,970,795 | B1 | 11/2005 | Burgett | |
| 8,188,912 | B1 * | 5/2012 | Weisenburger | G01S 19/46 |
| | | | | 342/357.24 |
| 8,949,025 | B2 * | 2/2015 | Garin | G01S 19/22 |
| | | | | 342/357.28 |

(Continued)

OTHER PUBLICATIONS

Form PCT/ISA/220, PCT/US2017/049579, "Notification of Transmittal of the International Search Report and the Written Opinion of the International Searching Authority, or the Declaration", 1 page(s); Form PCT/ISA/210, PCT/US2017/049579, "International Search Report", 6 page(s); EPO Form P04A42, PCT/US2017/049579, "Information on Search Strategy", 1 page(s); Form PCT/ISA/237, PCT/US2017/049579, "Written Opinion of the International Searching Authority", 12 page(s), dated Jan. 17, 2018.

(Continued)

*Primary Examiner* — Mohammad K Islam
(74) *Attorney, Agent, or Firm* — Kyle Pendergrass

(57) ABSTRACT

Determining an altitude error value associated with an estimated altitude of a mobile device. In certain disclosed systems and methods for determining an altitude error value associated with an estimated altitude of a mobile device, a first error value related to systematic error and a second error value related to statistical error are determined, and the altitude error value is determined using the first error value and the second error value.

46 Claims, 11 Drawing Sheets

(56) References Cited

U.S. PATENT DOCUMENTS

| | | | | |
|---|---|---|---|---|
| 2001/0047230 A1* | 11/2001 | Gremmert | ............... | G01C 5/005 701/4 |
| 2007/0239326 A1* | 10/2007 | Johnson | ............... | G08G 5/0086 701/9 |
| 2010/0019938 A1* | 1/2010 | Bunch | ............... | G01S 7/04 340/963 |
| 2010/0212421 A1 | 8/2010 | Young | | |
| 2012/0265373 A1* | 10/2012 | Ingvalson | ............... | G01C 5/06 701/4 |
| 2013/0204567 A1* | 8/2013 | Nieminen | ............... | G01C 5/00 702/94 |
| 2014/0092130 A1* | 4/2014 | Anderson | ............... | G06F 3/011 345/632 |
| 2014/0174175 A1* | 6/2014 | Chun | ............... | G01C 5/06 73/384 |
| 2015/0281884 A1* | 10/2015 | Smith | ............... | H04W 4/029 455/456.3 |
| 2016/0047648 A1* | 2/2016 | Edge | ............... | H04W 4/025 455/73 |
| 2016/0245716 A1* | 8/2016 | Gum | ............... | G01C 5/06 |
| 2017/0039863 A1* | 2/2017 | Mashio | ............... | G08G 5/0021 |
| 2018/0003494 A1* | 1/2018 | Fleming | ............... | G01C 5/06 |
| 2018/0073951 A1* | 3/2018 | Venkatraman | ............... | G01C 21/165 |
| 2018/0095059 A1* | 4/2018 | McQuillen | ............... | G01S 15/931 |

OTHER PUBLICATIONS

Angelo Sabatini et al: "A Stochastic Approach to Noise Modeling for Barometric Altimeters", Sensors, vol. 13, No. 11, Nov. 18, 2013 (Nov. 18, 2013), pp. 15692-15707, XP055419074, DOI: 10.3390/s131115692 equation 5: p. 15695: table 1.

Form PCT/ISA/206, PCT/US2017/049579, "Invitation to pay additional fees and, where applicable, protest fee", 7 page(s); EPO Form P04A42, PCT/ US2017/049579, "Information on Search Strategy", 1 page(s); EPO Form 1717 04.17, PCT/ US2017/049579, "Information on Search Strategy", 1 page(s); EPO Form 1707 04.17, PCT/US2017/049579, "Information on search strategy", 6 page(s); dated Nov. 9, 2017.

\* cited by examiner

SYSTEMS AND METHODS FOR DETERMINING AN ALTITUDE ERROR VALUE ASSOCIATED WITH AN ESTIMATED ALTITUDE OF A MOBILE DEVICE

RELATED APPLICATIONS

This application relates to the following related application(s): U.S. Pat. Appl. No. 62/395,975, filed Sep. 16, 2016, entitled CHARACTERIZING CONFIDENCE OF REPORTED ALTITUDE IN A BAROMETRIC BASED POSITIONING SYSTEM. The content of each of the related application(s) is hereby incorporated by reference herein in its entirety.

BACKGROUND

Generating an estimated altitude of a mobile device such as a mobile phone can be accomplished with accurate measurements of ambient temperature and ambient pressure measured by one or more reference sensors positioned at known locations, along with a local pressure measured by a local pressure sensor of the mobile device. One well-known approach for generating an estimated altitude of a mobile device uses a barometric formula depicted in Equation 1 below:

$$h_{user} = h_{ref} + \frac{RT_{ref}}{gM} \ln\left(\frac{P_{ref}}{P_{user}}\right), \quad \text{(Equation 1)}$$

where g corresponds to the acceleration due to gravity, R is the universal gas constant, M is the molar mass of dry air, $P_{user}$ is a measurement of pressure measured by a local pressure sensor of the mobile device, $P_{ref}$ is a measurement of pressure measured by a reference pressure sensor or an estimated reference pressure value for a reference altitude that is based on the measurement of the pressure measured by the reference pressure sensor, $h_{ref}$ is a known altitude of the reference pressure sensor or the reference altitude, and $T_{ref}$ is a measurement of temperature measured by a reference temperature sensor. In particular embodiments, $h_{ref}=0$ for sea-level altitude.

Estimated altitudes that are generated using Equation 1 rarely match true altitude. Instead, the quality of an estimated altitude directly depends on systematic error caused by various conditions (e.g., drift of the local pressure sensor, artificial pressurization of buildings, weather conditions affecting a reference sensor and/or a mobile device's sensor, quantization from rounding/truncating data to save space in memory, or other reasons). The quality of the estimated altitude also depends on statistical error induced by noise of individual measurements of local pressure, ambient pressure and ambient temperature. Different systems and methods that address systematic error and statistical error are described in the disclosure that follows.

DETAILED DESCRIPTION

Figure 1:
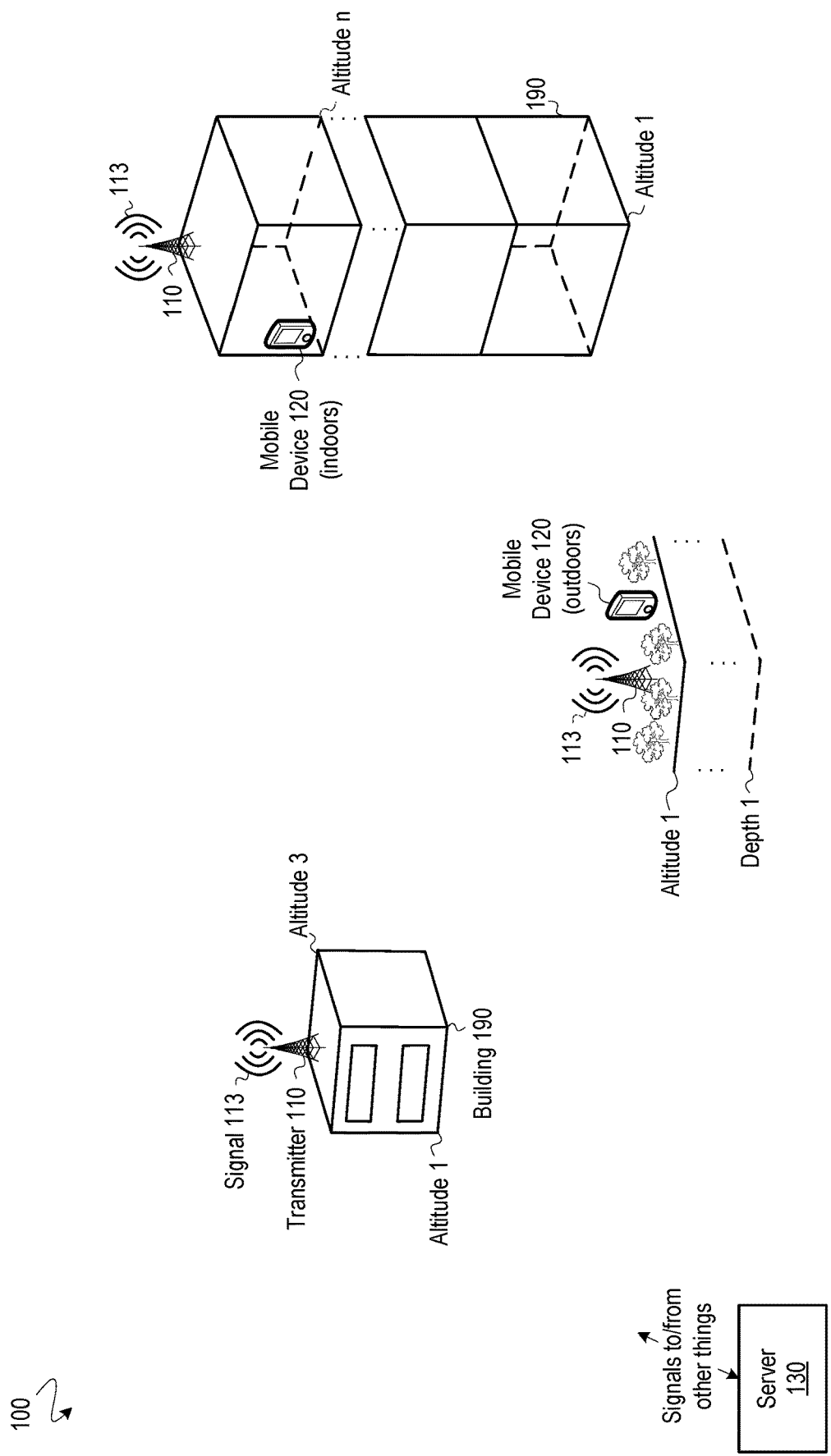
FIG. 1 depicts an operational environment for determining an altitude error value associated with an estimated altitude of a mobile device.

Systems and methods for determining an altitude error value associated with an estimated altitude of a mobile device are described below. Attention is initially drawn to an operational environment 100 illustrated in FIG. 1, which includes a network of terrestrial transmitters 110, at least one mobile device 120 that may be indoors or outdoors at different times, and a server 130. Each of the transmitters 110 and the mobile device 120 may be located at different altitudes or depths that are inside or outside various natural or manmade structures (e.g. buildings) 190. Positioning signals 113 are sent to the mobile device 120 from the transmitters 110 using known wireless or wired transmission technologies. The transmitters 110 may transmit the signals 113 using one or more common multiplexing parameters— e.g. time slot, pseudorandom sequence, frequency offset, or other. The mobile device 120 may take different forms, including a mobile phone, a tablet, a laptop, a tracking tag, a receiver, or another suitable device that can receive the positioning signals 113.

Different aspects of the operational environment of FIG. 1 are known to make estimated altitudes of the mobile device 120 less accurate. The processes discussed below provide a quantitative value that represents the confidence in an estimated altitude of a mobile device. This quantitative value is specified as an altitude error value, which may be used to adjust an estimated altitude, or may be reported along with the estimated altitude. Different ways of using the altitude error value are discussed later in the 'Using the altitude error value' section. Prior to this discussion, attention is given to different approaches for determining the altitude error value, including the process provided in FIG. 2, which provides a process for determining an altitude error value associated with an estimated altitude of a mobile device.

Figure 2:
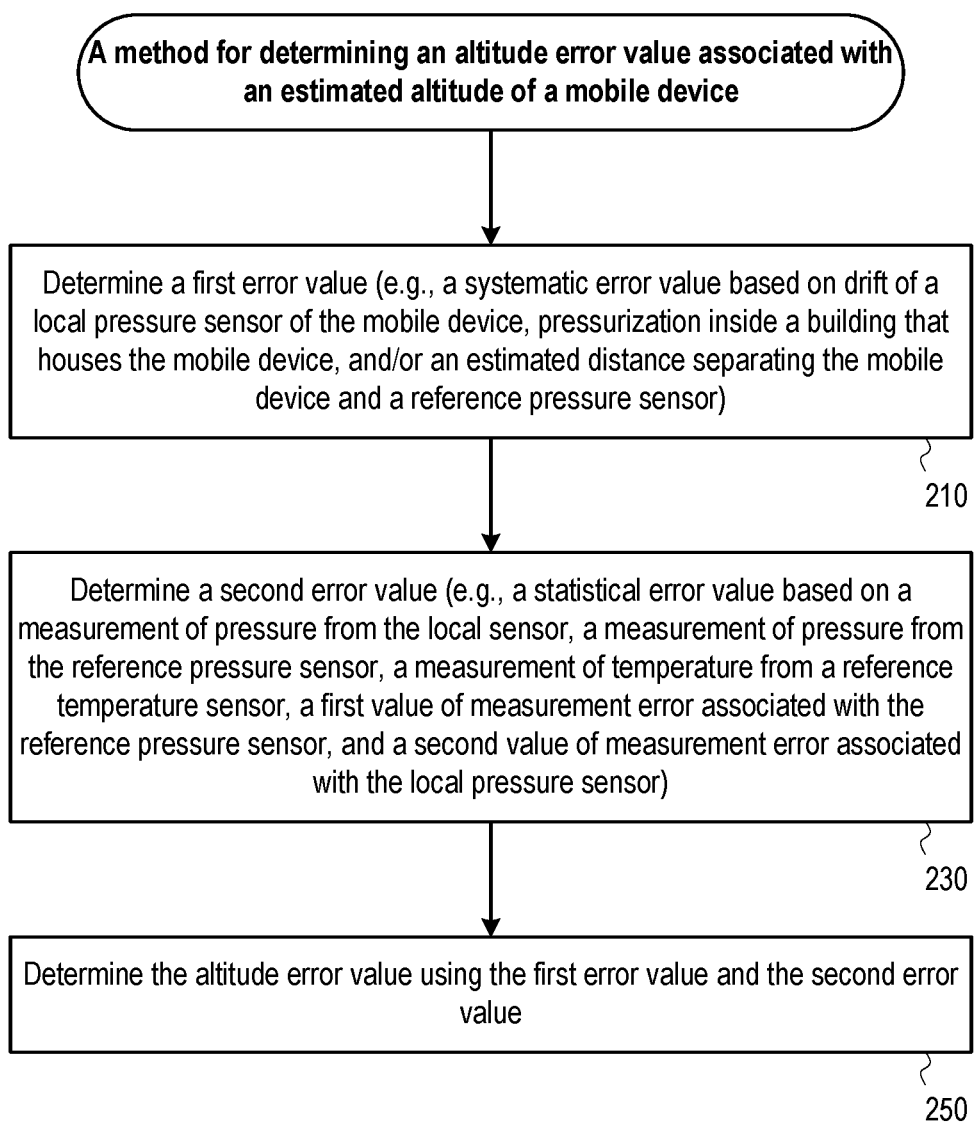
FIG. 2 provides a process for determining an altitude error value associated with an estimated altitude of a mobile device.

As shown in FIG. 2, a first error value is determined during step 210. Detail about determining a first error value during step 210 is provided below in the 'Determining a first error value' section. As will be discussed later, the first error value may be a systematic error value based on different issues, including drift of a local pressure sensor of the mobile device, artificial pressurization inside a building that houses the mobile device, and/or relationships between weather conditions and distances that separate the mobile device and reference pressure sensors.

A second error value is determined during step 230. Detail about determining a second error value during step 230 is provided below in the 'Determining a second error value' section. As will be discussed later, the second error value may be a statistical error value based on a measurement of pressure from the local sensor, a measurement of pressure from a reference pressure sensor, a measurement of temperature from a reference temperature sensor, a first value of measurement error of the reference pressure sensor, and/or a second value of measurement error of the local pressure sensor.

The first error value and the second error value are used to determine the altitude error value during step 250. Detail about determining an altitude error value using the first error value and the second error value during step 250 is provided below in the 'Determining an altitude error value using the first error value and the second error value' section.

Figure 3:
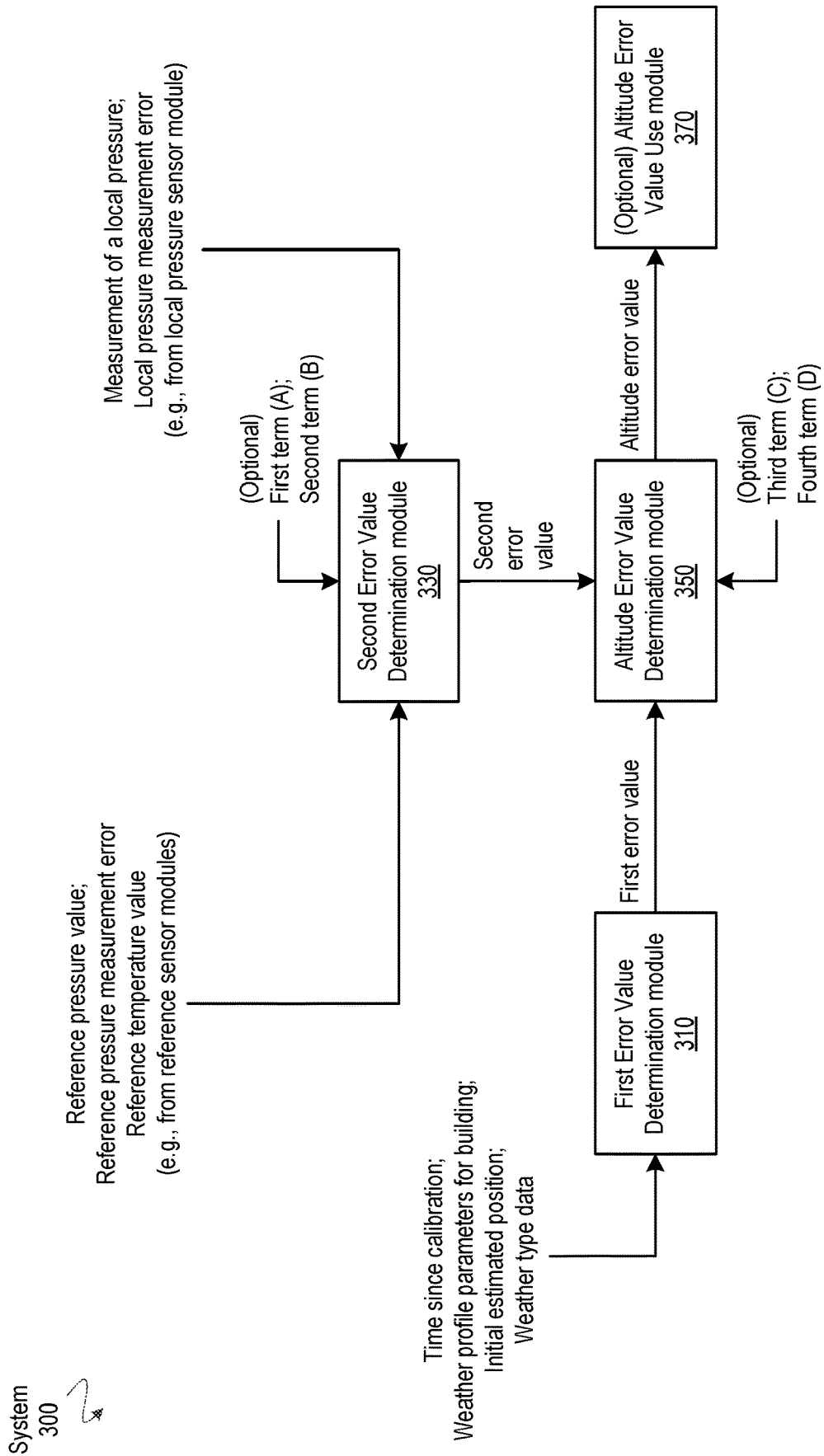
FIG. 3 depicts a system for determining an altitude error value associated with an estimated altitude of a mobile device.

One system for determining an altitude error value associated with an estimated altitude of a mobile device is depicted in FIG. 3. As shown, a system 300 includes modules that are each operable to carry out different steps of FIG. 2, including: a First Error Value Determination module 310 operable to perform step 210; a Second Error Value Determination module 330 operable to perform step 230; an Altitude Error Value Determination module 350 operable to perform step 250; and an (optional) Altitude Error Value Use module 370. By way of example, the system 300 depicted in FIG. 3 is the mobile device 120 from FIG. 1.

The First Error Value Determination module 310 receives information (e.g., a time since a local pressure sensor of the mobile device was calibrated, weather profile parameters for building housing the mobile device, an initial estimated position of the mobile device, data specifying a type of weather in the operational environment that includes the mobile device, and/or other information). The First Error Value Determination module 310 uses the information it receives to determine a first error value (e.g., using the process of FIG. 4), which is used by the Altitude Error Value Determination module 350 to determine the altitude error value.

The Second Error Value Determination module 330 receives information from a local pressure sensor module (e.g., a pressure sensor) of the mobile device. By way of example, the information is shown to include a measurement of pressure measured by the local pressure sensor module, and a value of pressure measurement error for the local pressure sensor module. In one embodiment, the value of pressure measurement error is determined by the local pressure sensor module when the software of the local pressure sensor module is enabled to provide the measurement and the value of measurement error for the local pressure sensor module, as is known in the art. In another embodiment, the value of pressure measurement error is calculated by reading and recording every sample pressure measurement within a specified time frame, and measuring the error of the distribution—e.g., if local pressure sensor module read ten pressure values of 1010, 1020, 1010, 1040, 1100, 980, 1010, 1020, 1020, and 1010 (in hPa) in the span of 1 second, then the averaged measurement is 1022 hPa and the standard deviation (i.e., the value of pressure measurement error) is calculated as 30 hPa.

The Second Error Value Determination module 330 also receives information from one or more reference sensor modules, which may include a reference pressure sensor and a reference temperature sensor that are co-located with one of the transmitters 110 of FIG. 1. The information may be transmitted in a signal provided to the mobile device 120 by the transmitter. By way of example, the information is shown to include one or more reference pressure value(s) from reference pressure sensor module(s), value(s) of reference pressure measurement error from the reference pressure sensor module(s), and/or measurement(s) of temperature measured by reference temperature sensor module(s). Each reference pressure value may include a measurement of pressure measured by a reference pressure sensor, or an estimated reference pressure value for a reference altitude that is based on the measurement of the pressure measured by the reference pressure sensor, as is known in art. Each value of reference pressure measurement error may be provided by the reference pressure sensor, as is known.

Figure 5:
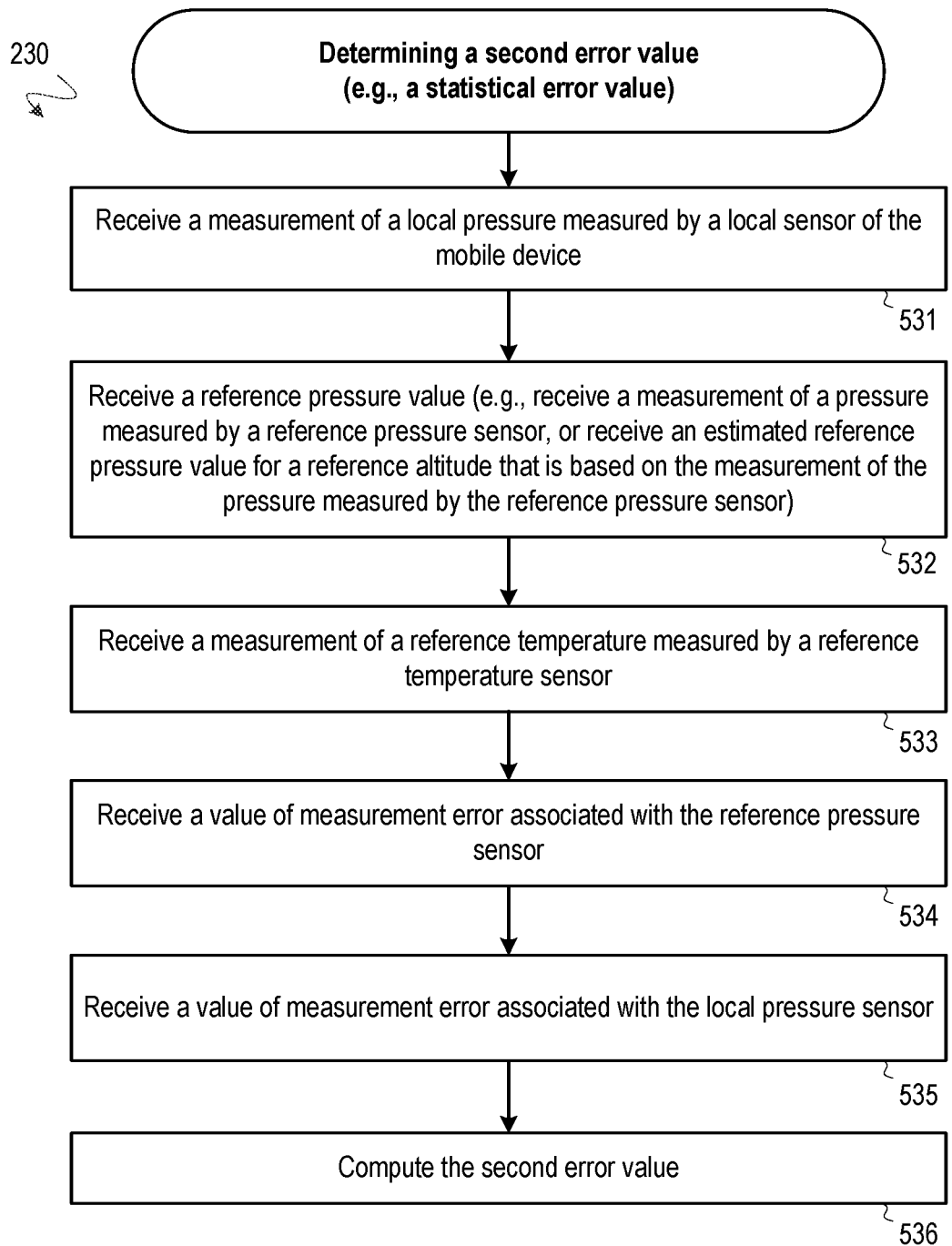
FIG. 5 provides a process for determining a second error value.
Figure 6:
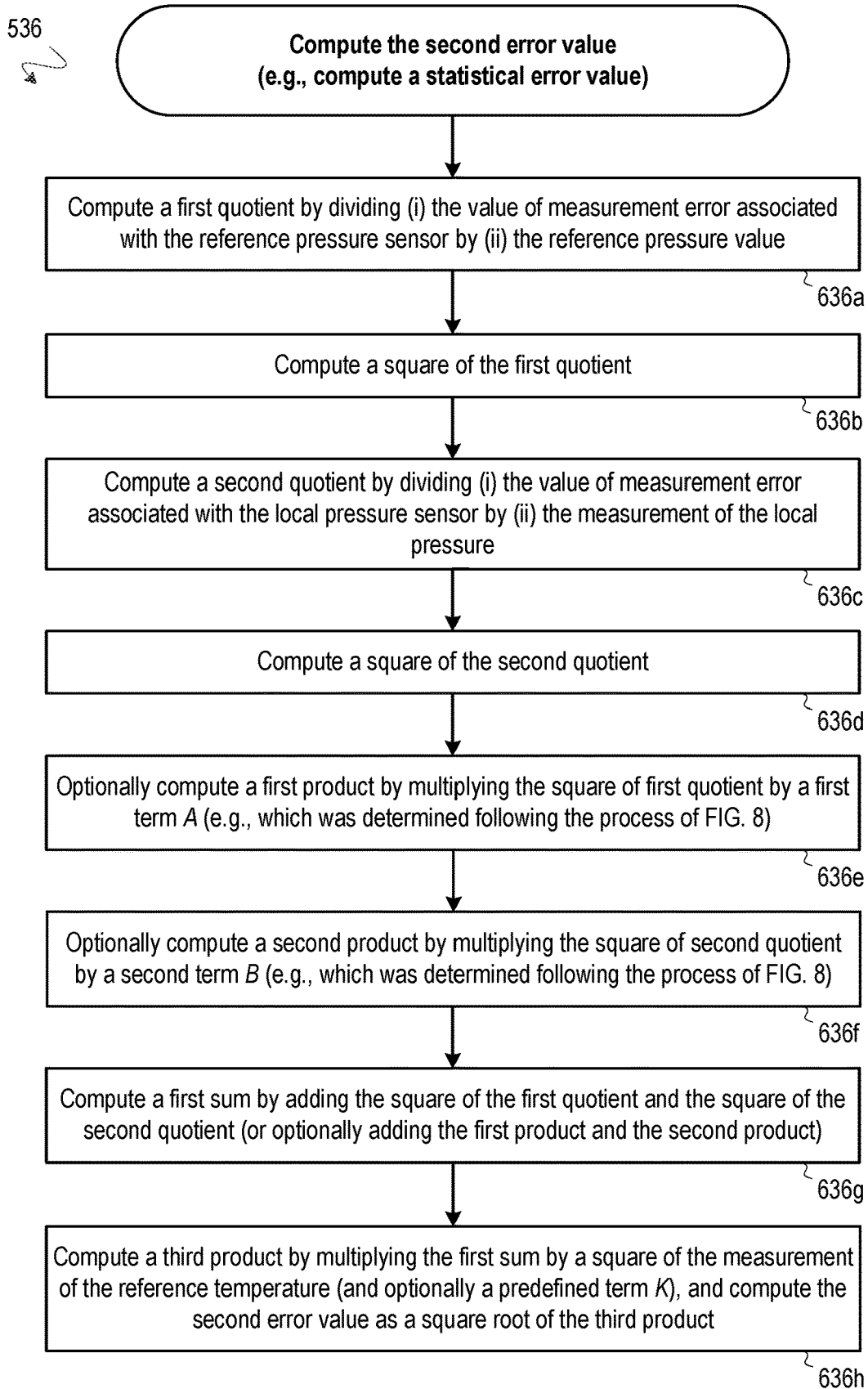
FIG. 6 provides a process for computing the second error value.

The Second Error Value Determination module 330 uses the information it receives to determine a second error value (e.g., using the processes of FIG. 5 and FIG. 6). The second error value is used by the Altitude Error Value Determination module 350 to determine the altitude error value. In an optional embodiment described later in FIG. 6, the Second Error Value Determination module 330 receives two terms (e.g., a first term, and a second term) for use in determining the second error value.

Figure 7:
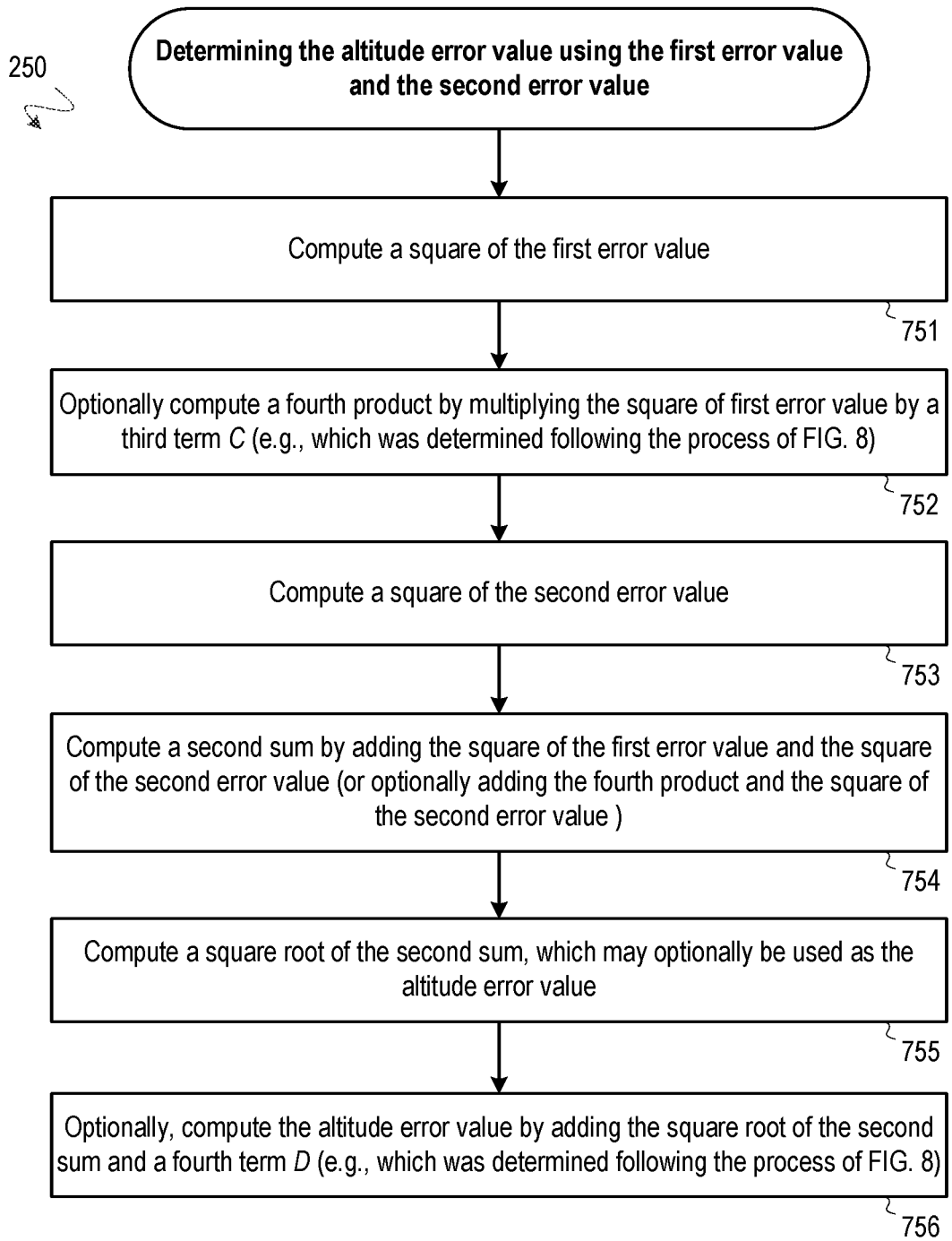
FIG. 7 provides a process for determining an altitude error value using the first error value and the second error value.

The Altitude Error Value Determination module 350 uses the first error value and the second error value to determine an altitude error value (e.g., using the process of FIG. 7). In an optional embodiment described in FIG. 7, the Altitude Error Value Determination module 350 receives two terms (e.g., a third term, and a fourth term) for use in determining the altitude error value.

The modules 310, 330, 350, and 370 may be embodied as a machine (e.g., a processor that executes program instructions that embody the step performed by the particular module). The Altitude Error Value Use module 370 may also include a display screen of the mobile device for displaying a visual representation of the altitude error value.

Determining a First Error Value (Step 210)

The accuracy of an estimated altitude of a mobile device is affected by systematic errors owing to instrumental effects (e.g., drift by the local pressure sensor of the mobile device), building effects (e.g., over or under pressurization of a building that houses the mobile device), environmental effects (e.g., a current type of weather in an operational environment and distances separating reference sensors and the mobile device), and/or measurement and message quantization (e.g., where data is rounded or truncated to reduce the size of the data).

Each of these systematic errors may be determined, and a first error value may be set to any of these systematic errors, or to any combination of these systematic errors.

Systematic errors owing to instrumental effects are often fixed or variable. Some systematic errors owing to instrumental effects can be Monte Carlo simulated in order to combine them into a single error value. For example, two normal/Gaussian errors of error_1 and error_2 can be combined as $\text{error\_total} = (\sqrt{(\text{error\_1})^2 + (\text{error\_2})^2})/2$. In practice, not all errors are treated in the same way (e.g., where one error is normally distributed, and the other error is uniformly distributed, and the two errors have different means: 1±2 and 2±3). A combination of these errors has no simple closed-form, analytical solution. Instead, the errors are combined using a Monte Carlo simulation, where each error is sampled from all individual errors and added together. The final error distribution can be used to determine the standard deviation or the cumulative distribution function (CDF).

Other systematic errors owing to instrumental effects can be described as a linearly growing error that is directly proportional to a time period since the local pressure sensor was last calibrated. In one embodiment, an expected drift rate DR is identified, a time T since the local pressure sensor was last calibrated is identified, and a drift error $e_{drift}$ is computed as computed as $e_{drift}=DR*T$. By way of example, the expected drift rate DR may be determined by measuring an amount of drift over time for each of a sample of similar pressure sensors, and setting the expected drift rate DR to the average or mean drift rate of the sample, the worst drift rate of the sample, or another value. Other approaches for determining a drift error are possible. The first error value may be set to the drift error, or the first error value may be determined by combining the drift error with other systematic error(s).

Systematic errors owing to building effects can be described as an error due to artificial pressurization inside a building as well as the stack effect. Approaches for determining an error due to artificial pressurization inside a building are described in U.S. application Ser. No. 15/487,215, filed on Apr. 13, 2017, entitled CHARACTERIZING AND USING BUILDING WEATHER PROFILE PARAMETERS, which specifies a process of detecting when the mobile device (referred to as a "receiver") is inside a building, identifying weather profile parameters for the building, computing an initial estimated altitude of the mobile device, and determining a corrected altitude estimate. Using this process, a systematic error owing to building effects can be computed as the difference between the corrected altitude estimate and the initial estimated altitude. The first error value may be set to this difference, or the first error value may be determined by combining this difference with other systematic error(s). Instead of computing the difference between the corrected altitude estimate and the initial estimated altitude, an induced pressure difference can be computed as illustrated in U.S. application Ser. No. 15/487,215, and the induced pressure difference can be converted to a difference in altitude equal to the induced pressure difference divided by 12.0 Pa/meter or another conversion value. The first error value may be set to this difference in altitude, or the first error value may be determined by combining this difference in altitude with other systematic error(s). Alternatively, when weather profile parameters for the building are not available, the weather parameters for another building (or averages of weather parameters for other buildings) may be used. In one embodiment, when weather parameters are unknown for a building, the existence of artificial pressurization inside the building is detected when an initial estimated altitude that was computed using measurements of pressure differs by a threshold amount of altitude from another estimate of the altitude that does not rely upon measurements of pressure. By way of example, the threshold amount may be X units of measurement (e.g., 1 meter, 2 meters, or another value). The other estimate of the altitude that does not rely upon measurements of pressure may include an altitude of a floor at which the mobile device resides (e.g., as determined by user input, connection to a local network on that floor, entry into a geo-fenced area of that floor, or other techniques).

Systematic errors owing to environmental effects can sometimes be described as different errors due to distances separating a local pressure sensor (e.g., of a mobile device) and different reference pressure sensors as a function of the current type of weather in a particular operational environment at a particular time. An estimated altitude of a mobile device that is generated using measurements of pressure from a first reference pressure sensor and the local pressure sensor is often less accurate than an estimated altitude that is generated using measurements of pressure from the local pressure sensor and a second reference pressure sensor when the distance separating the local pressure sensor and the first reference pressure sensor is longer than the distance separating the local pressure sensor and the second reference pressure sensor. Thus, in some circumstances, systematic errors owing to environmental effects are different for different distances separating the local pressure sensor and different reference pressure sensors. Such systematic errors tend to have different functional forms for different types of weather like calm weather and/or not calm weather, and have different functional forms different operational environments in different climates. Thus, different values for systematic errors owing to environmental effects can be used for different distances. For example, when weather is not calm, one city may have variable systematic errors that vary depending on particular distances separating the local pressure sensor and particular reference pressure sensors—e.g., a larger systematic error for a longer distance separating the local pressure sensor and a particular reference pressure sensor relative to a smaller systematic error for a shorter distance separating the local pressure sensor and another reference pressure sensor. On the other hand, when weather is calm, the city may use fixed systematic error assigned to ranges of distances, such that the same value of systematic error is used for two distances that fall within a particular range of distances. Of course, in another city, fixed systematic error may be used when the weather is not calm, and/or variable systematic error may be used when the weather is calm.

The type of weather can be used to determine when and how to compensate for systematic errors owing to environmental effects that are based on distances separating the local reference sensor of a mobile device and reference pressure sensors increase. For example, when weather in the operational environment is detected as being a first type of weather—e.g., "calm" weather—systematic errors owing to environmental effects can be set to one error value when the distance separating the mobile device and a reference pressure sensor falls below a first threshold distance (e.g., 5.0 kilometers), and systematic errors owing to environmental effects can be set to other values when the distance separating the mobile device and a reference pressure sensor exceeds the first threshold distance (e.g., a particular value when the distance exceeds the first threshold distance; e.g., one value when the distance exceeds the first threshold distance but does not exceed a second threshold distance, and yet another value when the distance exceeds the second threshold distance). Of course, any number of threshold distances may be used to control when particular values are used, and both the number of threshold distances and the particular values may depend on different systematic errors present in different operational environments at different times of the year.

In at least one embodiment, "calm" weather is detected when (1) a wind speed measured by a wind sensor (e.g., at a weather station) in the operational environment does not exceed a predefined threshold amount of wind speed (e.g., zero wind speed, 15.0 km/hr or less wind speed); (2) a first difference in pressure that does not exceed a first predefined threshold amount of pressure (e.g., 12.0 Pa or another value), wherein the first difference in pressure is a difference between (i) a first reference pressure estimated for a reference altitude using a first measurement of pressure measured during a first time period (e.g., a time period of less than 1 minute) from a first sensor, and (ii) a second reference pressure estimated for the reference altitude using a second measurement of pressure measured during the first time period from a second sensor; (3) a second difference in pressure that does not exceed a second predefined threshold amount of pressure (e.g., 50.0 Pa or another value), wherein the second difference in pressure is a difference between (i) a first measurement of pressure measured at a first time by a first sensor, and (ii) a second measurement of pressure measured at a second time by the first sensor or another sensor (e.g., wherein the first time and the second time are separated by a predefined amount of time, such as 1 minute, 3 minutes, 5 minutes, 15 minutes, 1 hour, or another amount greater than the length of the first time period); (4) a third difference in pressure that does not exceed the second predefined threshold amount of pressure, wherein the third difference in pressure is a difference between (i) a first reference pressure estimated for a reference altitude using the first measurement of pressure measured at the first time, and (ii) a second reference pressure estimated for the reference altitude using the second measurement of pressure measured at the second time; (5) a temperature measured by a temperature sensor (e.g., at a weather station) in the operational environment is not below (i.e., not colder than) a historical average temperature value for the same hour, day, week, or other time period during which the measured temperature was determined; and/or (6) precipitation measured by a precipitation sensor (e.g., at a weather station) in the operational environment does not exceed a predefined threshold amount of precipitation (e.g., any precipitation, trace amounts of precipitation, 1 centimeter or more of precipitation, or another value).

Figure 10:
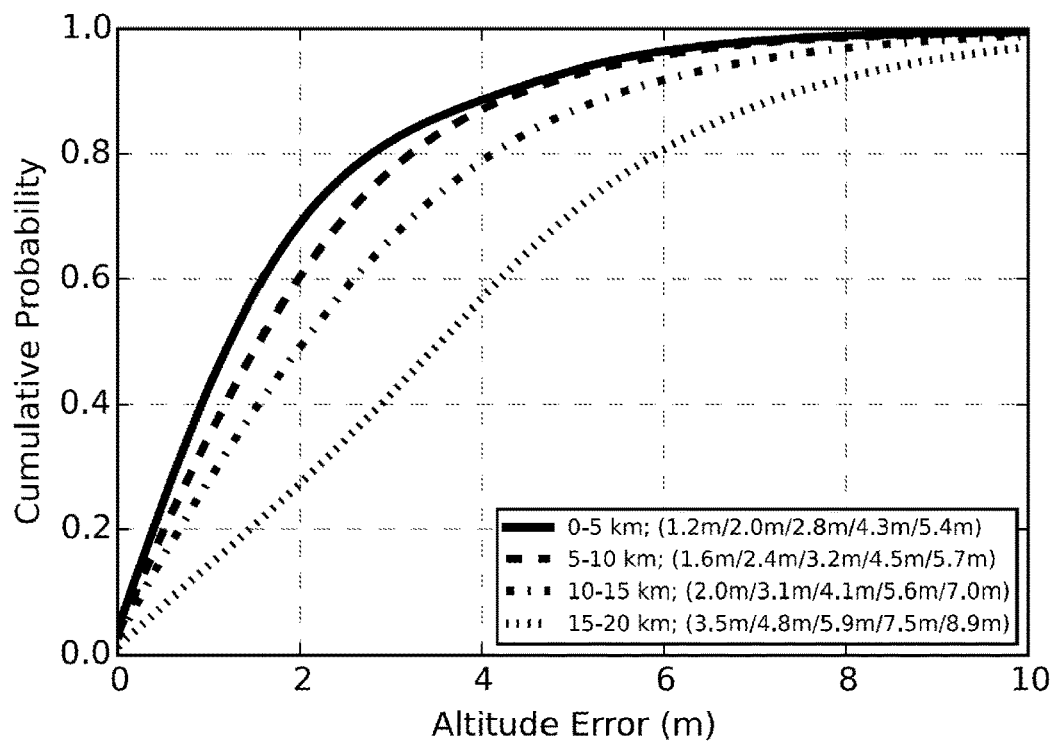
FIG. 10 depicts a functional dependence of systematic error owing to environmental effects on the distance between a mobile device and reference sensors.
Figure 11:
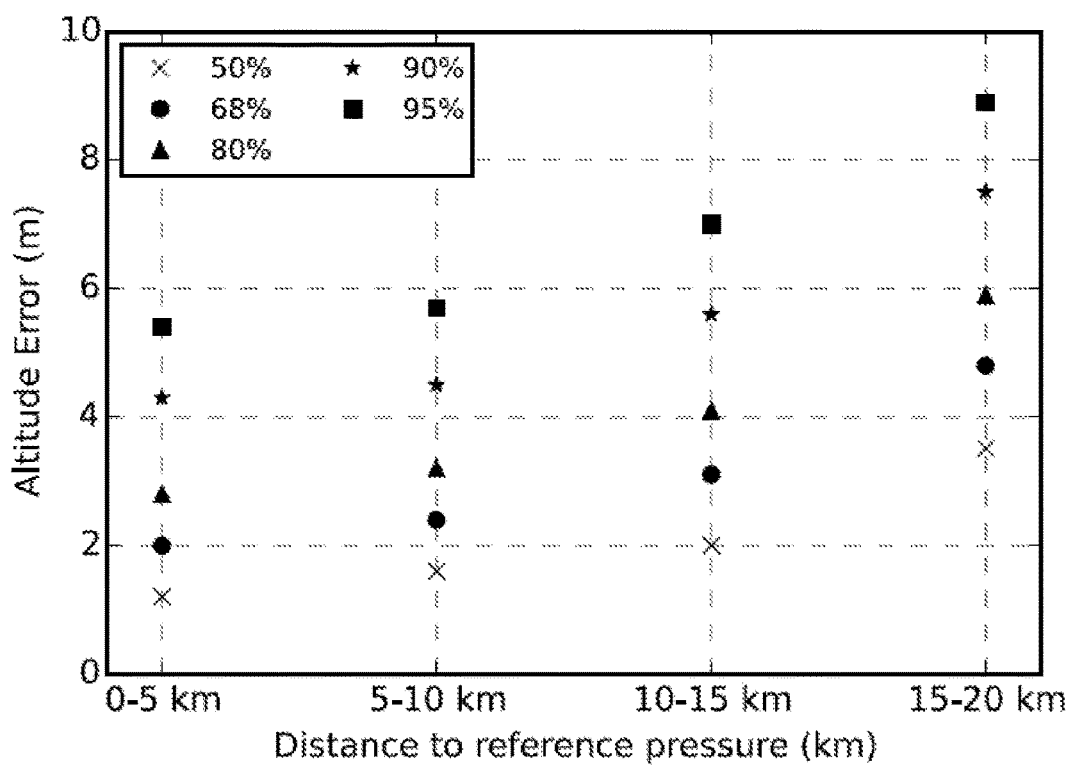
FIG. 11 depicts a generally linear relationship between systematic error owing to environmental effects and distances between a mobile device and reference sensors.

When weather in the operational environment is detected as being a second type of weather—e.g., "not calm" weather—systematic errors owing to environmental effects depend on the distance separating the mobile device and a reference pressure sensor. By way of illustration, FIG. 10 depicts a functional dependence of systematic error owing to environmental effects on the distance between a mobile device and various reference sensors during a second type of weather. The plots in FIG. 10 represent the CDF's of multiple distance combinations (e.g. 0-5 km, 5-10 km, 10-15 km, and 15-20 km), and the parentheses in the legend of the graph indicate the 50/68/80/90/95% CDF values of these distributions. As shown, the CDF's become less accurate as the distance between the mobile device and the reference sensor increases, especially above 5 km. By way of further illustration, FIG. 11 depicts a generally linear relationship between systematic error owing to environmental effects and distances between a mobile device and reference pressure sensors. Thus, a value of a systematic error owing to environmental effects during the second type of weather may be determined by applying a predefined multiplier to the distance separating the mobile device and a reference pressure sensor. In one embodiment, a single multiplier is used for all distances. In another embodiment, different multipliers are used for different ranges of distances—e.g., a first multiplier is used when the estimated distance is within a first range of distances (such as 0-5 km), a second multiplier is used when the estimated distance is within a second range of distances (such as 5-10 km), and so on for different combinations of multipliers and ranges of distances.

In at least one embodiment, "not calm" weather is detected when (1) the measured wind speed exceeds the predefined threshold amount of wind speed; (2) the first difference in pressure exceeds the first predefined threshold amount of pressure; (3) the second difference in pressure exceeds the second predefined threshold amount of pressure; (4) the third difference in pressure exceeds the second predefined threshold amount of pressure; (5) the measured temperature is below (i.e., colder than) the historical average temperature value; and/or (6) the measured precipitation exceeds the predefined threshold amount of precipitation.

In one embodiment, pressure measurements from a particular reference pressure sensor are recorded and compared over a predefined time period to determine if a difference between two of the measurements exceeds a predefined value. For example, a plurality of pressure measurements from a pressure sensor are recorded every t units of time (e.g. t=1, 5, 10 or another number of seconds) as: 101407, 101364, 101330, 101320, 101355, 101421, 101412, 101368, 101403, 101390, and so one, where each measurement is in units of Pa. A process for detecting a type of weather includes the steps of: recording successive measurements of pressure from the pressure sensor; determining if differences between measurements that were recorded within a threshold amount of time from each other (e.g., 30, 60, 90, or another number of seconds) exceed a threshold amount of pressure (e.g. 100 Pa); concluding the weather is not calm when the difference exceeds the threshold amount of pressure; and optionally concluding the weather is calm when the difference does not exceeds the threshold amount of pressure. Another process for detecting a type of weather includes the steps of: recording successive measurements of pressure from a pressure sensor over a predefined time period (e.g. 30, 60 or another number of seconds); computing the standard deviation of those measurements of pressure; determining if the computed standard deviation exceeds a threshold value of standard deviation (e.g., 10 Pa); concluding the weather is not calm when the computed standard deviation exceeds the threshold value of standard deviation; and optionally concluding the weather is calm when the computed standard deviation does not exceed the threshold value of standard deviation.

In a different embodiment, assuming two pressure sensors are at altitudes that are within a threshold amount of altitude (e.g., 1, 2, 3, 4 or another number of meters), pressure measurements from each of the two pressure sensors are measured at times $T_1, T_2, \ldots T_n$, and a difference between the measurements of pressure at each time is recorded. The recorded difference may be adjusted by an amount of expected change in pressure from the altitude of one sensor to the altitude of the other sensor. Alternatively, where the two pressure sensors are at altitudes that are not within a threshold amount of altitude, the pressure measurements from each sensor is converted to a reference pressure measurement at the same reference altitude, as is known in the art, and a difference between the reference pressure measurements at each time is recorded. The recorded differences are compared to determine if a computed difference between two of the recorded differences exceeds a predefined value. By way of example, a plurality of differences between actual pressure measurements or between reference pressure measurements corresponding to two pressure sensors are recorded every t units of time (e.g. t=1, 5, 10 or another number of seconds) as: 12, 35, 95, 51, 4, and so on, where each recorded difference is in units of Pa. A process for detecting a type of weather includes the steps of: recording successive differences between measurements of pressure (or reference pressure measurements) corresponding to two pressure sensors; determining if a computed difference between two recorded differences exceed a threshold difference in pressure (e.g. 50 Pa); concluding the weather is not calm when the computed difference exceeds the threshold amount of pressure; and optionally concluding the weather is calm when the computed difference does not exceeds the threshold amount of pressure. Another process for detecting a type of weather includes the steps of: recording successive differences between measurements of pressure (or reference pressure measurements) corresponding to two pressure sensors; computing the standard deviation of those differences of pressure; determining if the computed standard deviation exceeds a threshold value of standard deviation (e.g., 10 Pa); concluding the weather is not calm when the computed standard deviation exceeds the threshold value of standard deviation; and optionally concluding the weather is calm when the computed standard deviation does not exceed the threshold value of standard deviation.

Figure 4:
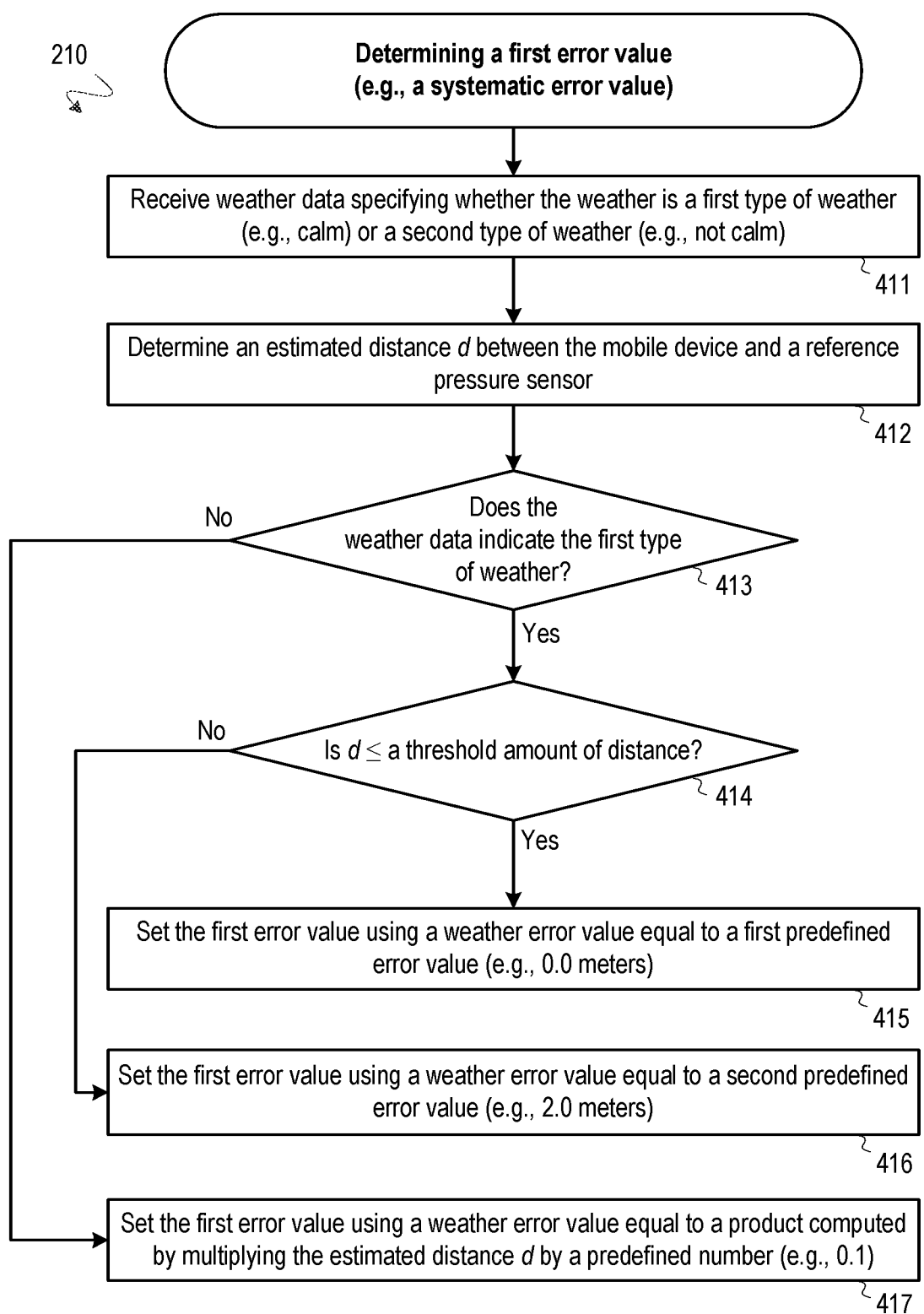
FIG. 4 provides a process for determining a first error value.

If the weather cannot be characterized as any type of weather (e.g., when there is insufficient data to definitively detect the weather in the operational environment as being a particular type of weather), the process may err on the side of caution and use an error value resulting in the largest systematic error (e.g., use the largest of the error values shown in steps 415, 416 and 417 of FIG. 4). FIG. 4 provides one implementation for determining a first error value at step 210, where the first error value is owing to environmental effects. As shown, weather data specifying a first type of weather (e.g., calm weather) or a second type of weather (e.g., not the first type of weather) in an operational environment that includes the mobile device is received (step 411).

An estimated distance d between a mobile device and a reference pressure sensor is determined (step 412). The units of measurement for the estimated distance d may include any type of units (e.g., meters, kilometers, or other). In one embodiment, the estimated distance d is determined by computing a difference between an initial estimated position of the mobile device and a known location of the reference pressure sensor, where the known location is provided via a signal 113 from a transmitter 110 that is co-located with the reference pressure sensor, or where the known location is accessed from the server 130 or another source. The initial estimated position may be estimated using known techniques, such as trilateration, which uses estimated ranges between the mobile device and known locations of transmitters, where the estimated ranges are determined by estimating distances traveled by ranging signals from those transmitters.

A determination is made as to whether the weather data indicates that the weather in the operational environment is the first type of weather (step 413). In one embodiment, the weather data is compared to predefined parameters of the first weather type, a determination is made that the weather data indicates the first type of weather is present in the operational environment when the weather data and the predefined parameters match, and a determination is made that the weather data indicates the first type of weather is not present in the operational environment when the weather data and the predefined parameters do not match. Similarly, the weather data may be compared to predefined parameters of the second weather type, a determination is made that the weather data indicates the second type of weather is present in the operational environment when the weather data and the predefined parameters match, and a determination is made that the weather data indicates the second type of weather is not present in the operational environment when the weather data and the predefined parameters do not match. If the weather data indicates that the weather in the operational environment is the first type of weather, the process proceeds to step 414. If the weather data indicates that the weather in the operational environment is not the first type of weather (or is a second type of weather), the process proceeds to step 417.

A determination is made as to whether the estimated distance d is less than or equal to a threshold amount of distance (step 414). By way of example, the threshold distance in one embodiment is 5 kilometers. If the estimated distance is less than or equal to the threshold amount of distance, the process proceeds to step 415. If the estimated distance is not less than or equal to the threshold amount of distance, the process proceeds to step 416.

During step 415, the first error value is set to a weather error value equal to a first predefined error value (e.g., $x_1$ units of measurement, such as 0.0 meters), or the first error value is set to a value that combines the first predefined error value with other systematic error(s).

During step 416, the first error value is set to a weather error value equal to a second predefined error value (e.g., $x_2$ units of measurement, such as 2.0 meters), or the first error value is set to a value that combines the second predefined error value with other systematic error(s).

During step 417, the first error value is set to a weather error value equal to a product computed by multiplying the estimated distance d by a predefined number (e.g., 0.1), or the first error value is set to a value that combines the product with other systematic error(s).

In embodiments when more than one reference pressure sensor is used, steps 412-417 are repeated for each reference pressure sensor, but steps 415-417 are modified as follows: step 415 is modified to set an error value for the reference pressure sensor to a first predefined error value, step 416 is modified to set an error value for the reference pressure sensor to a second predefined error value, and step 417 is modified to set an error value for the reference pressure sensor to a product of the estimated distance multiplied by the predefined number. An additional step 418 computes the first error value using the error values for each of the reference pressure sensors. In one implementation, the first error value is computed by using Equation 2 below:

$$\text{first error value} = \frac{h_1/(1+d_1) + h_2/(1+d_2) + \ldots + h_N/(1+d_N)}{1/(1+d_1) + 1/(1+d_2) + \ldots + 1/(1+d_N)}, \quad \text{(Equation 2)}$$

where $h_1, h_2, \ldots h_N$ are the N error values for N reference pressure sensors, and $d_1, d_2, \ldots d_N$ are the N estimated distances between the mobile device and the N reference pressure sensors.

Systematic errors can be combined in different ways: by adding the systematic errors, which would result in sum of the systematic error; by averaging the systematic errors, which would result in a typical systematic error; or by combining the errors using another approach. Prior to combining systematic errors, each systematic error can be weighted.

Determining a Second Error Value (Step 230)

A well-understood approach for estimating the altitude of a mobile device ($h_{user}$) uses a barometric formula of Equation 3 shown below:

$$h_{user} = h_{ref} + \frac{RT_{ref}}{gM} \ln\left(\frac{P_{ref}}{P_{user}}\right), \quad \text{(Equation 3)}$$

where g corresponds to the acceleration due to gravity, R is the universal gas constant, M is the molar mass of dry air, $P_{user}$ is a measurement of pressure measured by a local pressure sensor of the mobile device, $P_{ref}$ is a measurement of pressure measured by a reference pressure sensor or an estimated reference pressure value for a reference altitude that is based on the measurement of the pressure measured by the reference pressure sensor, $h_{ref}$ is a known altitude of the reference pressure sensor or the reference altitude, and $T_{ref}$ is a measurement of temperature measured by a reference temperature sensor. The reference pressure sensor and the reference temperature sensor may be co-located with a transmitter (e.g., one of the transmitters 110 from FIG. 1), which transmits $P_{ref}$, $T_{ref}$, and $h_{ref}$ to the mobile device via a signal (a signal 113).

Each of $P_{ref}$, $T_{ref}$, and $P_{user}$ has an associated error $\Delta P_{ref}$, $\Delta T_{ref}$, and $\Delta P_{user}$, such that: $P_{ref} \pm \Delta P_{ref}$, $T_{ref} \pm \Delta T_{ref}$, and $P_{user} \pm \Delta P_{user}$. The second error value ($\Delta h_{user}$) can be calculated when $P_{ref}$, $T_{ref}$, $P_{user}$, $\Delta P_{ref}$, $\Delta T_{ref}$, and $\Delta P_{user}$ are known.

One approach for determining the second error value ($\Delta_{user}$) uses Equation 3 from above and partial derivatives. The estimated altitude of the mobile device ($h_{user}$) can be written in the functional form $h_{user} = h_{user}(T_{ref}, P_{ref}, P_{user})$ since the estimated altitude of the mobile device ($h_{user}$) depends on $P_{ref}$, $T_{ref}$, and $P_{user}$. Thus, the second error value ($\Delta h_{user} = \sigma_{h_{user}}$) can be generally defined by Equation 4 below:

$$\sigma_{h_{user}}^2 = \left(\frac{\partial h}{\partial T}\right)^2 \sigma_T^2 + \left(\frac{\partial h}{\partial P_{ref}}\right)^2 \sigma_{P_{ref}}^2 + \quad \text{(Equation 4)}$$

$$\left(\frac{\partial h}{\partial P_{user}}\right)^2 \sigma_{P_{user}}^2 + 2\sigma_{T,P_{ref}} \left(\frac{\partial h}{\partial T}\right)\left(\frac{\partial h}{\partial P_{ref}}\right) +$$

$$2\sigma_{T,P_{user}} \left(\frac{\partial h}{\partial T}\right)\left(\frac{\partial}{\partial P_{user}}\right) + 2\sigma_{P_{user},P_{ref}} \left(\frac{\partial h}{\partial P_{user}}\right)\left(\frac{\partial h}{\partial P_{ref}}\right).$$

The error propagation formula above assumes error is quantified as "normal/Gaussian" error, or standard deviation $\sigma$, or variance $\sigma^2$. In practice, temperature varies much slower when compared to air pressure, so terms in Equation 4 that have any derivatives with respect to temperature may be removed, which results in Equation 5 below:

$$\sigma_{h_{user}}^2 = \left(\frac{\partial h}{\partial P_{ref}}\right)^2 \sigma_{P_{WS}}^2 + \left(\frac{\partial h}{\partial P_{user}}\right)^2 \sigma_{P_{user}}^2. \quad \text{(Equation 5)}$$

The first partial derivative is calculated by differentiating the barometric formula of Equation 3 with respect to $P_{ref}$ which results in Equation 6 below:

$$\left(\frac{\partial h}{\partial P_{ref}}\right) = \frac{RT_{ref}}{gM}\left(\frac{1}{P_{ref}}\right) \approx \frac{30\, T_{ref}}{P_{ref}}. \quad \text{(Equation 6)}$$

The second partial derivative is calculated by differentiating the barometric formula of Equation 3 with respect to $P_{user}$, which results in Equation 7 below:

$$\left(\frac{\partial h}{\partial P_{user}}\right) = -\frac{RT_{ref}}{gM}\left(\frac{1}{P_{user}}\right) \approx -\frac{30\, T_{ref}}{P_{user}}. \quad \text{(Equation 7)}$$

Figure 8:
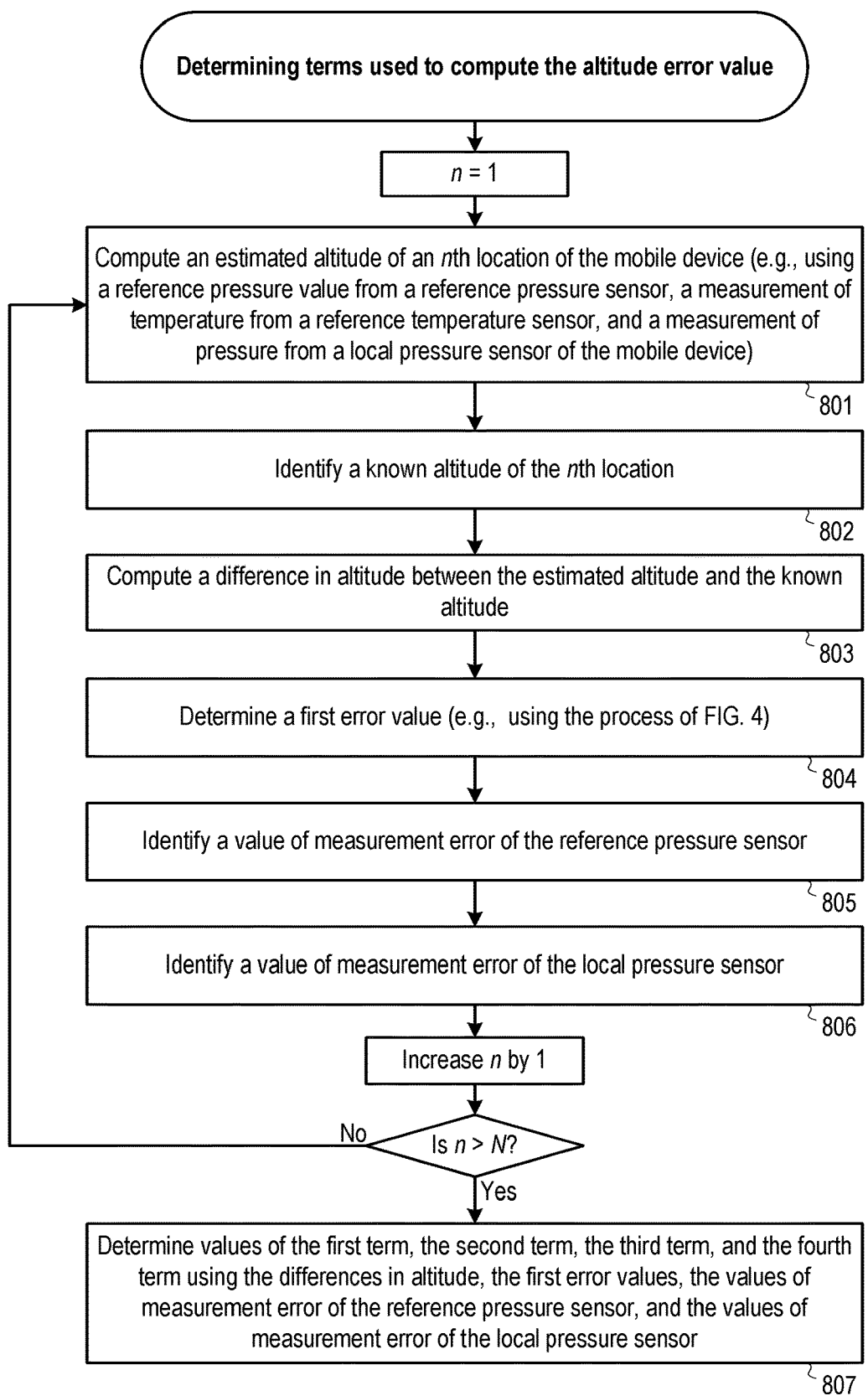
FIG. 8 provides a process for determining terms used to compute the altitude error value.

Equations 6 and 7 are applied to Equation 5 to obtain Equation 8 below:

$$\sigma_{h_{user}}^2 \approx K\, T_{ref}^2 \left[ A\left(\frac{\sigma_{P_{ref}}}{P_{ref}}\right)^2 + B\left(\frac{\sigma_{P_{user}}}{P_{user}}\right)^2 \right], \quad \text{(Equation 8)}$$

where K=900 or another value, A and B are optional terms that may be derived following the process of FIG. 8, and $\sigma_{P_{ref}}$ and $\sigma_{P_{user}}$ represent respective values of measurement error of the reference pressure sensor and the local reference pressure sensor. Such values of measurement error can be directly read by the sensors (assuming the software of the sensors returns both the measurement and values of measurement error), or such values can be calculated by reading and recording every sample pressure measurement within a specified time frame, and measuring the error of the distribution—e.g., ten pressure measurements of 1010, 1020, 1010, 1040, 1100, 980, 1010, 1020, 1020, and 1010 (in hPa) read in the span of 1 second produce an averaged measurement of 1022 hPa with a value of measurement error of 30 hPa.

A square root is applied to each side of Equation 8 to produce the second error value ($\Delta h_{user} = \sigma_{h_{user}}$), which is depicted in Equation 9 below:

$$\sigma_{h_{user}} = \sqrt{K\, T_{ref}^2 \left[ A\left(\frac{\sigma_{P_{ref}}}{P_{ref}}\right)^2 + B\left(\frac{\sigma_{P_{user}}}{P_{user}}\right)^2 \right]}. \quad \text{(Equation 9)}$$

One implementation for determining a second error value at step 230 includes sub-steps provided in FIG. 5.

As shown, various information is received, including a measurement of a local pressure measured by a local sensor of the mobile device (step 531), a reference pressure value (step 532), a measurement of a reference temperature measured by a reference temperature sensor (step 533), a value of measurement error of the reference pressure sensor (step 534), and a value of measurement error of the local pressure sensor (step 535). After receiving the information, the second error value is computed (step 536). In embodiments when more than one reference pressure sensor is used, step 532 and step 534 are repeated for each of the reference pressure sensors in use. Step 533 may also be repeated for each reference temperature sensor when more than one reference temperature sensor is use. In one embodiment of step 536, the second error value is computed based on (i) a first mathematical relationship between the reference pressure value and the value of measurement error of the reference pressure sensor, (ii) a second mathematical relationship between the measurement of the local pressure and the value of measurement error of the local pressure sensor, (iii) a third mathematical relationship between the first relationship and the second relationship, and (iv) a fourth mathematical relationship between the third mathematical relationship and the measurement of the reference temperature. One implementation of this embodiment is illustrated in FIG. 6, which provides a process for computing the second error value.

As shown in FIG. 6, a first quotient is computed by dividing (i) the value of measurement error of the reference pressure sensor by (ii) the reference pressure value (step 636a). A square of the first quotient is computed (step 636b). A second quotient is computed by dividing (i) the value of measurement error of the local pressure sensor by (ii) the measurement of the local pressure (step 636c). A square of the second quotient is computed (step 636d). Optionally, a first product is computed by multiplying the square of first quotient by a first term (step 636e), and a second product is computed by multiplying the square of second quotient by a second term (step 636f). In one embodiment, the first term and the second term are determined following the process of FIG. 8, which is described later. A first sum is computed by adding the square of the first quotient and the square of the second quotient (step 636g). When steps 636e and 636f are performed, step 636g is modified to compute the first sum by adding the first product and the second product. Finally, a third product is computed by multiplying the first sum by a square of the measurement of the reference temperature, and then computing the second error value as a square root of the third product (step 636h). In one embodiment, the third product is computed by multiplying the first sum by a square of the measurement of the reference temperature and multiplying the result by a predefined term K.

In an alternative embodiment, steps 636a, 636b, 636c, and 636d are replaced by the steps of: computing squares of items (i) and (ii) during step 636a; computing a first quotient by dividing the square of item (i) by the square of item (ii) during step 636b; computing squares of items (i) and (ii) during step 636c; and computing a first quotient by dividing the square of item (i) by the square of item (ii) during step 636d.

In embodiments when more than one reference pressure sensor is used, step 636a is preceded by steps of: (i) computing a single reference pressure value using the received reference pressure values; and (ii) computing a single value of measurement error of the reference pressure sensors using the received values of measurement error of each of the reference pressure sensors. In these embodiments, step 636a is modified to compute the first quotient by dividing (i) the single value of measurement error by (ii) the single reference pressure value.

In one implementation when more than one reference pressure sensor is used, the single reference pressure value is computed by: (i) computing weighted reference pressure values by multiplying each of the received reference pressure values by a respective weight; (ii) computing a weighted sum by adding the weighted reference pressure values; (iii) and dividing the weighted sum by a sum of the weights. An example of this implementation is provided below in Equation 10 below:

$$P_{ref} = \frac{w_1 P_1 + w_2 P_2 + \cdots + w_N P_N}{w_1 + w_2 + \cdots + w_N},$$ (Equation 10)

for received reference pressure values $P_1, P_2, \ldots, P_N$ from reference pressure sensors $Ref_1, Ref_2, \ldots, Ref_N$, and associated weights $w_1, w_2, \ldots, W_N$.

In one implementation when more than one reference pressure sensor is used, the single value of measurement error of the reference pressure sensor is computed by: (i) computing weighted values of measurement error by multiplying each of the received values of measurement error by a respective weight; (ii) computing a weighted sum by adding the weighted values of measurement error; (iii) and dividing the weighted sum by a sum of the weights. An example of this implementation is provided below in Equation 11 below:

$$\sigma_{P_{ref}}^2 = \frac{w_1^2 \sigma_1^2 + w_2^2 \sigma_2^2 + \cdots + w_N^2 \sigma_N^2}{w_1^2 + w_2^2 + \cdots + w_N^2},$$ (Equation 11)

for received values of measurement error $\sigma_1, \sigma_2, \ldots, \sigma_N$ from reference pressure sensors $Ref_1, Ref_2, \ldots, Ref_N$, and associated weights $w_1, w_2, \ldots, W_N$.

In embodiments when more than one reference temperature sensor is used, step 636h is preceded by step of: computing a reference temperature value using the received measurements of reference temperatures. In these embodiments, step 636h is modified to compute the third product by multiplying the first sum by a square of the reference temperature value (and optionally a predefined term), and compute the second error value as a square root of the third product. In one implementation when more than one reference temperature sensor is used, the reference temperature value is computed by: (i) computing weighted measurements of temperature by multiplying each of the received measurements of temperature by a respective weight; (ii) computing a weighted sum by adding the weighted measurements of temperature; (iii) and dividing the weighted sum by a sum of the weights. An example of this implementation is provided below in Equation 12 below:

$$T_{ref} = \frac{w_1 T_1 + w_2 T_2 + \cdots + w_N T_N}{w_1 + w_2 + \cdots + w_N},$$ (Equation 12)

for received measurements of temperature $T_1, T_2, \ldots, T_N$ from reference pressure sensors $Ref_1, Ref_2, \ldots, Ref_N$, and associated weights $w_1, w_2, \ldots, W_N$.

Determining an Altitude Error Value Using the First Error Value and the Second Error Value (Step 250)

By way of example, the altitude error value may be computed using Equation 13 below:

$$\Delta h = \sqrt{\sigma_{h_{user}}^2 + \sigma_{h_{systematic}}^2}$$ (Equation 13), where $\Delta h$ is the altitude error value, $\sigma_{h_{systematic}}$ is the first error value (e.g., a systematic error value), and $\sigma_{h_{user}}$ the second error value (e.g., a statistical error value).

In one embodiment, a third term (i.e., C) and a fourth term (i.e., D) are introduced in order to align the computation of the altitude error value with actual field data, which results in Equation 14 below:

$$\Delta h = \sqrt{\sigma_{h_{user}}^2 + C\sigma_{h_{systematic}}^2} + D$$ (Equation 14), which can be rewritten to show the first term (i.e., A) and the second term (i.e., B) in Equation 15 below:

$$\Delta h = \qquad \text{(Equation 15)}$$

$$\sqrt{K\, T_{ref}^2\left[A\left(\frac{\sigma_{P_{ref}}}{P_{ref}}\right)^2 + B\left(\frac{\sigma_{P_{user}}}{P_{user}}\right)^2\right] + C\sigma_{h_{systematic}}^2} + D.$$

One implementation for determining an altitude error value using the first error value and the second error value is provided in FIG. 7. As shown, a square of the first error value is computed (step 751). Optionally, a fourth product is computed by multiplying the square of first error value by a third term (i.e., C) (step 752). In one embodiment, the third term is determined following the process of FIG. 8, which is described later. A square of the second error value is computed (step 753). A second sum is computed by adding the square of the first error value and the square of the second error value (step 754). When step 752 is performed, step 754 is modified to compute the second sum by adding the fourth product and the square of the second error value. A square root of the second sum is computed (step 755). In one embodiment, the altitude error value is set to the computed square root of the second sum. In another embodiment, the altitude error value is computed by adding the square root of the second sum and a fourth term (i.e., D) (step 756), where the fourth term is determined following the process of FIG. 8, which is described later.

Determining a First Term, a Second Term, a Third Term and a Fourth Term for Use in Computing an Altitude Error Value One implementation for computing a first term, a second term, a third term and a fourth term for use in computing an altitude error value is provided in FIG. 8.

As shown, steps 801-806 described below are performed N times, where N can be any number (e.g., 1, 10, or another number, but preferably at least 4 so no fitting parameter A, B, C and/or D is ambiguous). Steps 801-806 can be performed N times for one location of the mobile device, once at each of N locations of the mobile device where each of the N locations corresponds to a different combination of latitude-longitude-altitude, $N_1$ times at one location and $N_2$ times at other locations where $N_1+N_2=N$, or any other combination of N times. An estimated altitude ($h_{estimated\_n}$) of an nth location of the mobile device is computed (step 801). By way of example, the estimated altitude is computed using Equation 16 below:

$$h_{estimated\_n} = h_{ref\_n} + \frac{RT_{ref\_n}}{gM}\ln\left(\frac{P_{ref\_n}}{P_{user\_n}}\right), \qquad \text{(Equation 16)}$$

where $P_{user\_n}$ is a measurement of a local pressure measured by a local sensor of the mobile device, $P_{ref\_n}$ is a reference pressure value for a reference altitude that is based on a measurement of pressure measured by the reference pressure sensor, $T_{ref\_n}$ is a measurement of a temperature measured by a reference temperature sensor, and $h_{ref\_n}$ is the reference altitude (which may be an altitude of the reference pressure sensor).

A known altitude ($h_{known\_n}$) of the nth location is identified (step 802), and a difference in altitude ($\Delta h\_n$) between the estimated altitude and the known altitude is computed as $\Delta h\_n = h_{estimated\_n} - h_{known\_n}$ (step 803).

A first error value ($\sigma_{systematic\_n}$) is determined (step 804). By way of example, the first error value is calculated using the process of FIG. 4, or another approached described herein. A value of measurement error of the reference pressure sensor $$\left(\sigma_{P_{ref\_n}}\right)$$

is identified (step 805), and a value of measurement error of the local pressure sensor $$\left(\sigma_{P_{user\_n}}\right)$$

is identified (step 806). As described previously, these values of measurement errors are respectively provided by the reference pressure sensor and the local pressure sensor.

Values of the first term, the second term, the third term, and the fourth term are determined using the computed, determined and identified data for each of the N locations (e.g., the difference in altitude, the first error value, the value of measurement error of the reference pressure sensor, and the value of measurement error of the local pressure sensor for each of the N locations) (step 807).

One embodiment of step 807 involves selecting a particular combination of the first term (A), the second term (B), the third term (C), and the fourth term (D) that satisfies N instances of Equation 17 (shown below), where each instance of Equation 17 uses the computed, determined and identified data of a different location from N locations:

$$\left| \Delta h_n - \left( \sqrt{K\, T_{ref_n}^2\left[A\left(\frac{\sigma_{P_{ref_n}}}{P_{ref_n}}\right)^2 + B\left(\frac{\sigma_{P_{user_n}}}{P_{user_n}}\right)^2\right] + C\sigma_{h_{systematic_n}}^2} + D \right) \right| \leq H, \qquad \text{(Equation 17)}$$

where K=900 or another value, and H is a predefined value (e.g., zero, or another value). By way of example, for N=4 locations (e.g., locations n=1, n=2, n=3 and n=4), different combinations of A, B, C and D are applied to Equations 18A, 18B, 18C and 18D below:

$$\left| \Delta h_1 - \left( \sqrt{K\, T_{ref_1}^2\left[A\left(\frac{\sigma_{P_{ref_1}}}{P_{ref_1}}\right)^2 + B\left(\frac{\sigma_{P_{user_1}}}{P_{user_1}}\right)^2\right] + C\sigma_{h_{systematic_1}}^2} + D \right) \right| \leq H, \qquad \text{(Equation 18A)}$$

$$\left| \Delta h_2 - \left( \sqrt{K \, T_{ref_2}^2 \left[ A \left( \frac{\sigma_{P_{ref_2}}}{P_{ref_2}} \right)^2 + B \left( \frac{\sigma_{P_{user_2}}}{P_{user_2}} \right)^2 \right] + C \sigma_{h_{systematic_2}}^2} + D \right) \right| \leq H,$$ (Equation 18B)

$$\left| \Delta h_3 - \left( \sqrt{K \, T_{ref_3}^2 \left[ A \left( \frac{\sigma_{P_{ref_3}}}{P_{ref_3}} \right)^2 + B \left( \frac{\sigma_{P_{user_3}}}{P_{user_3}} \right)^2 \right] + C \sigma_{h_{systematic_3}}^2} + D \right) \right| \leq H,$$ (Equation 18C)

$$\left| \Delta h_4 - \left( \sqrt{K \, T_{ref_4}^2 \left[ A \left( \frac{\sigma_{P_{ref_4}}}{P_{ref_4}} \right)^2 + B \left( \frac{\sigma_{P_{user_4}}}{P_{user_4}} \right)^2 \right] + C \sigma_{h_{systematic_4}}^2} + D \right) \right| \leq H,$$ (Equation 18D)

until a particular combination of A, B, C and D satisfies each of Equations 18A, 18B, 18C, and 18D.

Alternative approaches for selecting a particular combination of A, B, C and D are contemplated. In one embodiment, a particular combination of A, B, C and D is selected when that combination satisfies a majority, or another number, of the N instances of Equation 17. In another embodiment, Equation 19 (shown below) is used instead of Equation 17, and a particular combination of A, B, C and D is selected when that combination results in an average of the differences (DIF) that is less than or equal to the threshold H.

$$\left| \Delta h_{\_n} - \left( \sqrt{K \, T_{ref\_n}^2 \left[ A \left( \frac{\sigma_{P\_ref\_n}}{P_{ref\_n}} \right)^2 + B \left( \frac{\sigma_{P_{user\_n}}}{P_{user\_n}} \right)^2 \right] + C \sigma_{h_{systematic\_n}}^2} + D \right) \right| = DIF.$$ (Equation 19)

Figure 12:
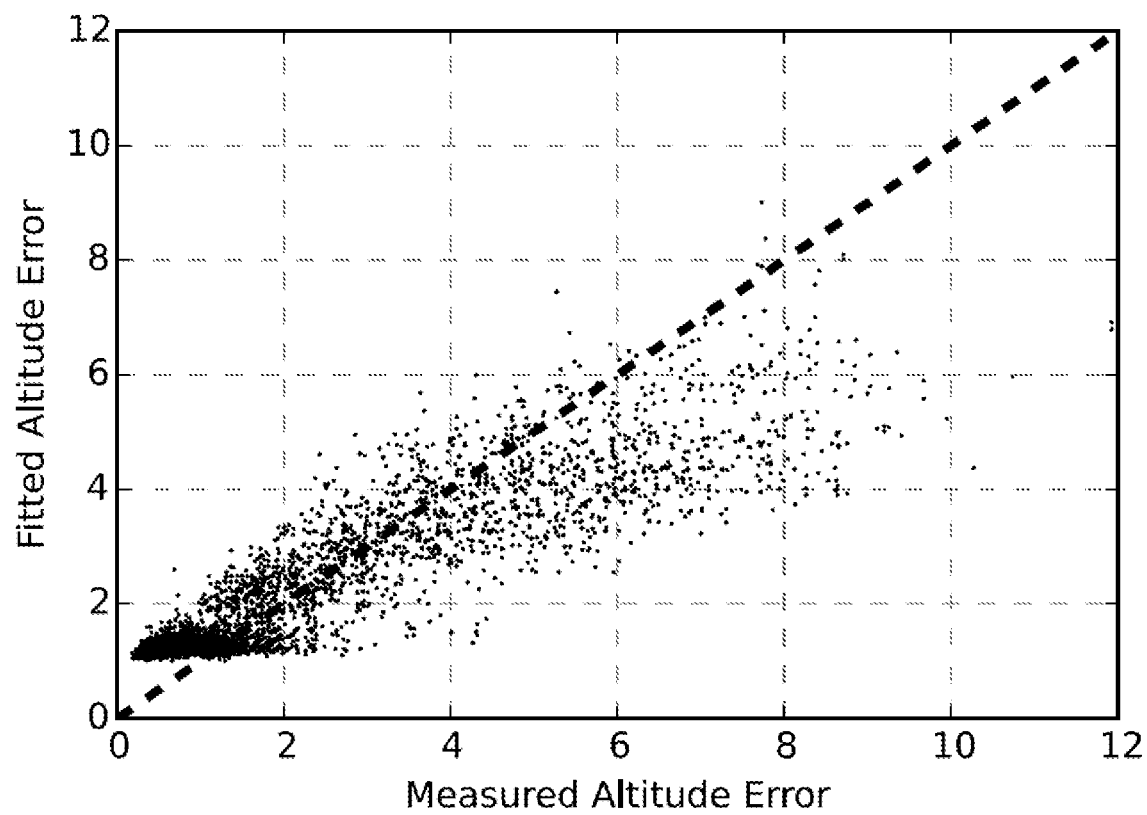
FIG. 12 depicts a comparison of measured altitude error with an estimate of altitude error that was estimated using four terms as fitted parameters.

By way of illustration, FIG. 12 depicts a comparison of measured altitude error with an estimate of altitude error that was estimated using different combination of four terms (e.g., terms A, B, C and D from Equation 17 above) as fitted parameters. As expected, most of the data aligns along the diagonal line which shows $\Delta h_{true} = \sigma_{h_{user}}$.

Using the Altitude Error Value

The altitude error value can be used in different ways.

In one embodiment, the altitude error value is translated into a visual representation overlaid onto a map that is displayed on a display screen of the mobile device. In different embodiments, the map may represent a two-dimensional profile such as vertical (altitude) vs. horizontal (latitude and longitude), or a stereoscopic three-dimensional image, or another representation.

Figure 9:
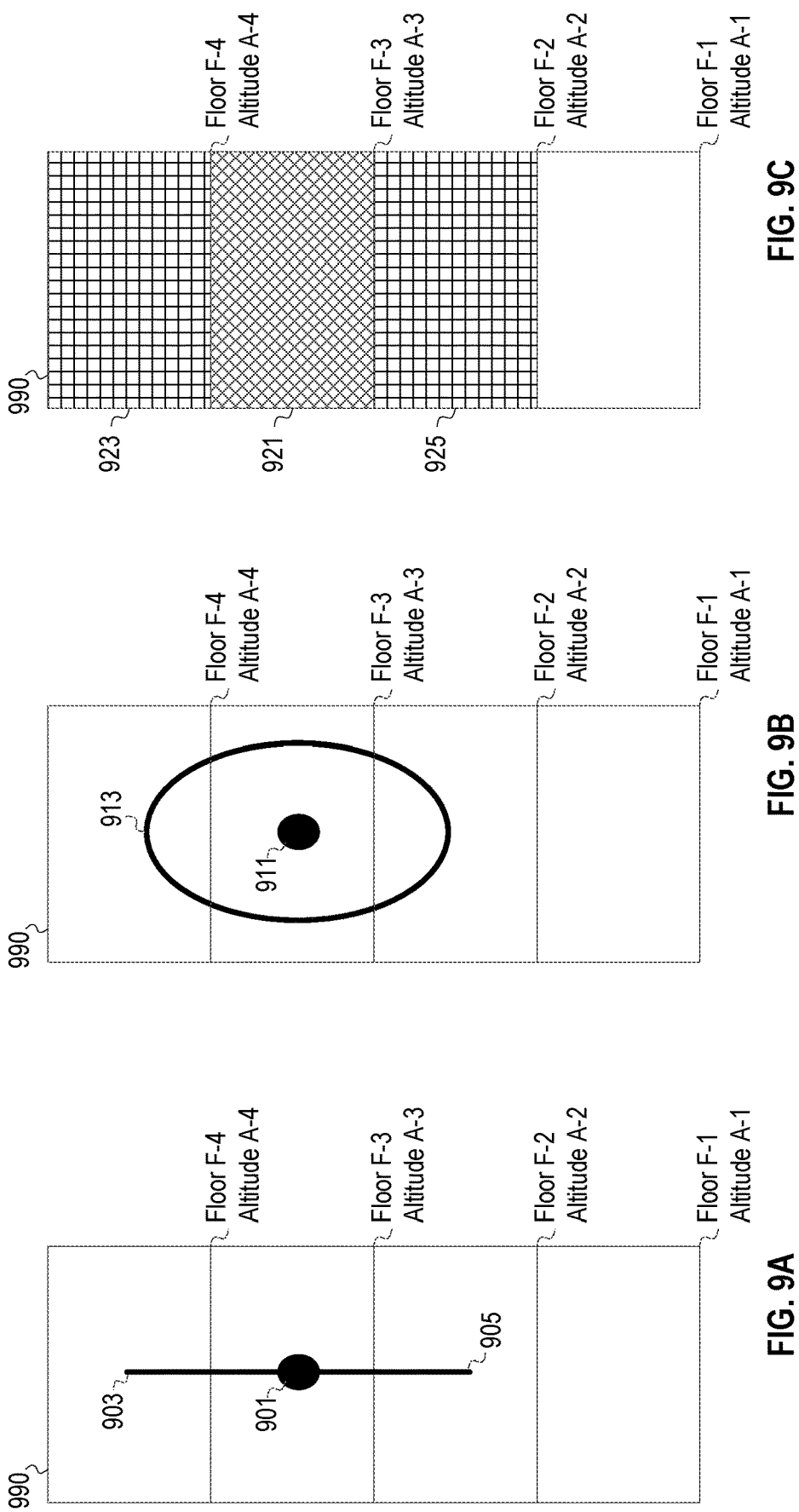
FIG. 9A, FIG. 9B and FIG. 9C provide different computer-generated visual representations of an estimated altitude and an altitude error value.

By way of example, FIG. 9A depicts a computer-generated visual representation of an estimated altitude and an altitude error value where the estimated altitude is depicted as a dot 901 on a map at a particular location (e.g., a third floor of a building 990), and a magnitude of the altitude error value is depicted by the length of a bar 903 and a bar 905 that each extend in opposite directions from the dot 901 to particular locations (e.g., fourth and second floors of the building 990).

By way of another example, FIG. 9B depicts a computer-generated visual representation of an estimated altitude and an altitude error value where the estimated altitude is depicted as a dot 911 on a map at a particular location (e.g., a third floor of a building 990), and the altitude error value is depicted as an outer edge of a circle 913. As shown in FIG. 9B, opposite edges of the circle 913 extend between two locations (e.g., the fourth and second floors of the building 990).

By way of another example, FIG. 9C depicts a computer-generated visual representation of an estimated altitude and an altitude error value where the estimated altitude is depicted as a shaded portion 921 on a map (e.g., a shaded portion covering a third floor of a building 990), and the altitude error value is depicted by shaded portions 923 and 925 (e.g., shaded portions covering the fourth and second floors of the building 990).

In another embodiment, the altitude error value is binned to language terms such as "good", "okay", "bad", or another term. In one implementation, the estimated altitude is provided with the language terms. The language terms may be selected based on the size of the altitude error value—e.g., "good" may be selected when the altitude error value is below a first threshold value (e.g., 1.5 meters), "okay" may be selected when the altitude error value is above the first threshold value and below a second threshold value (e.g., 3 meters), and "bad" may be selected when the altitude error value is above the second threshold value.

In yet another embodiment, the altitude error value is reported as a value (e.g. to a user of the mobile device 120, to the server 130, to an application, to an algorithm, or another thing). For example, a reported altitude may be reported as $h_{estimated} \pm h_{error}$, where $h_{error}$ is the altitude error value and $h_{estimated}$ is the estimated altitude. In another embodiment, a reported altitude may be reported as a floor number (e.g., floor 3) ±error in terms of a number of floors (e.g., 1).

Alternatively, the altitude error value may be used to compute reported values, such as a first reported value equal to $h_{estimated} + h_{error}$, and a second reported value equal to $h_{estimated} - h_{error}$, where $h_{error}$ is the altitude error value and $h_{estimated}$ is the estimated altitude.

Other Aspects

Embodiments disclosed herein compute altitude error values that provide various advantages over prior approaches that do not compute such altitude error values. For example, the embodiments provide an altitude error value that can be used to determine a more accurate estimate of altitude, which can be used in various applications to improve services that use the estimate of altitude (e.g., emergency response services, mapping services, navigation services, searching services for identifying locations of things that are near the mobile device, and other services).

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a mobile device or a server, may identify the following: the transmitter; the transmitter's location (LLA); pressure, temperature, humidity, and/or other conditions at or near the transmitter.

A mobile device may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the mobile device, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, humidity, wind, other), which may be compared to the same environmental conditions at or near transmitters to determine the altitude of the mobile device; other sensor module(s) for measuring other conditions (e.g., acceleration, velocity, orientation, light, sound); interface module(s) for exchanging information with other systems via other links other than a radio link; and/or input/output module(s) for permitting a user to interact with the mobile device. Processing by the mobile device can also occur at a server.

Examples of computing an estimated altitude of a mobile device have been provided using a measurement of pressure by a local pressure sensor of the mobile device. Alternative embodiments replace the measurement of pressure by the local pressure sensor with a measurement of pressure by a pressure sensor that is near the mobile device, where being near the mobile device may have different parameters, including being closer to the mobile device than the closest reference sensor, being within an atmospheric environment shared with the mobile device that experiences an amount of pressure that is within n Pascals (e.g., $n \leq 12$) of the true pressure experienced by the mobile device, or another parameter specifying a distance relative to the mobile device.

The invention claimed is:

1. A method for determining an altitude error value associated with an estimated altitude of a mobile device that resides in an operational environment, the method comprising:
determining a first error value;
determining a second error value; and
determining the altitude error value using the first error value and the second error value,
wherein determining the first error value is implemented by one or more machines, and wherein determining the first error value comprises:
determining an estimated distance between the mobile device and a reference pressure sensor;
determining if weather data specifies weather in the operational environment is a first type of weather;
determining a weather error value; and
using the weather error value to set the first error value,
wherein determining the weather error value comprises:
if a determination is made that the weather data specifies the weather in the operational environment is the first type of weather, determining a product computed by multiplying the estimated distance by a predefined number and determining the weather error value is the determined product;
if a determination is made that the weather data specifies the weather in the operational environment is not the first type of weather and the estimated distance is less than a threshold amount of distance, determining the weather error value is a first predefined error value; and
if a determination is made that the weather data specifies the weather in the operational environment is not the first type of weather and the estimated distance is greater than the threshold amount of distance, determining the weather error value is a second predefined error value.

2. The method of claim 1, wherein the method comprises: setting the first error value to the weather error value.

3. The method of claim 1, wherein the method comprises: setting the first error value to a combination of the weather error value and a drift error value related to drift of a local pressure sensor of the mobile device.

4. The method of claim 1, wherein the method comprises: setting the first error value to a combination of the weather error value and a pressurization error value related to pressurization inside a building that houses the mobile device.

5. The method of claim 1, wherein the first type of weather is calm weather specified by one or more of: a wind speed measured in the operational environment that does not exceed a predefined threshold amount of wind; a first difference in pressure that does not exceed a first predefined threshold amount of pressure, wherein the first difference in pressure is a difference between two reference pressures estimated for a reference altitude; a second difference in pressure that does not exceed a second predefined threshold amount of pressure, wherein the second difference in pressure is a difference between a first measurement of pressure measured at a first time and a second measurement of pressure measured at a second time; a third difference in pressure that does not exceed the second predefined threshold amount of pressure, wherein the third difference in pressure is a difference between a first reference pressure estimated using the first measurement of pressure and a second reference pressure estimated using the second measurement of pressure; a temperature measured in the operational environment that is not below a historical average temperature value; or precipitation measured in the operational environment that does not exceed a predefined threshold amount of precipitation.

6. The method of claim 1, wherein determining if the weather data specifies the weather in the operational environment is the first type of weather comprises:
comparing the weather data to predefined parameters of the first weather type;
determining that the weather data specifies the weather in the operational environment is the first type of weather when the weather data and the predefined parameters match; and
determining that the weather data specifies the weather in the operational environment is not the first type of weather when the weather data and the predefined parameters do not match.

7. The method of claim 1, wherein the product, the first predefined error value, and the second predefined error value are not the same value.

8. The method of claim 1, wherein determining the second error value comprises:
receiving a measurement of a local pressure measured by a local pressure sensor of the mobile device;
receiving a reference pressure value that is based on a measurement of pressure measured by a reference pressure sensor;
receiving a measurement of a reference temperature measured by a reference temperature sensor;
receiving a value of measurement error associated with the reference pressure sensor;
receiving a value of measurement error associated with the local pressure sensor; and
computing the second error value by:
computing a first quotient by dividing (i) the value of measurement error associated with the reference pressure sensor by (ii) the reference pressure value;
computing a square of the first quotient;
computing a second quotient by dividing (i) the value of measurement error associated with the local pressure sensor by (ii) the measurement of the local pressure;
computing a square of the second quotient;
computing a first sum by: (i) adding the square of the first quotient and the square of the second quotient, or (ii) computing a first product by multiplying the square of the first quotient by a first term, computing a second product by multiplying the square of the second quotient by a second term, and adding the first product and the second product;
computing a third product by multiplying the first sum by a square of the measurement of the reference temperature and a predefined value; and
computing the second error value as a square root of the third product.

9. The method of claim 8, wherein the first sum is computed by adding the square of the first quotient and the square of the second quotient.

10. The method of claim 8, wherein the first sum is computed by: computing the first product by multiplying the square of the first quotient by the first term, computing the second product by multiplying the square of the second quotient by the second term, and adding the first product and the second product.

11. The method of claim 10, wherein determining the altitude error value comprises:
   computing a square of the first error value,
   computing a fourth product by multiplying the square of the first error value by a third term,
   computing a square of the second error value,
   computing a second sum by adding the fourth product and the square of the second error value,
   computing a square root of the second sum, and
   determining the altitude error value using a third sum computed by adding the square root of the second sum and a fourth term,
   wherein the first, second, third and fourth terms are determined by:
      computing a first estimated altitude of a first location of the mobile device using a first reference pressure value from the reference pressure sensor, a first measurement of temperature from the reference temperature sensor, and a first measurement of pressure from the local pressure sensor of the mobile device;
      identifying a known altitude of the first location;
      computing a difference in altitude between the first estimated altitude and the known altitude;
      identifying a first value of measurement error of the reference pressure sensor;
      identifying a first value of measurement error of the local pressure sensor;
      determining values of the first term, the second term, the third term, and the fourth term using the difference in altitude, the first value of measurement error of the reference pressure sensor, and the first value of measurement error of the local pressure sensor.

12. The method of claim 8, wherein determining the altitude error value comprises:
   computing a square of the first error value;
   computing a square of the second error value;
   computing a second sum by adding the square of the first error value and the square of the second error value;
   computing a square root of the second sum; and
   determining the altitude error value using the square root of the second sum.

13. The method of claim 8, wherein determining the altitude error value comprises:
   computing a square of the first error value;
   computing a fourth product by multiplying the square of the first error value by a third term;
   computing a square of the second error value;
   computing a second sum by adding the fourth product and the square of the second error value;
   computing a square root of the second sum; and
   determining the altitude error value using a third sum computed by adding the square root of the second sum and a fourth term.

14. The method of claim 1, wherein determining the altitude error value comprises:
   computing a square of the first error value;
   computing a square of the second error value;
   computing a sum by adding the square of the first error value and the square of the second error value;
   computing a square root of the sum; and
   determining the altitude error value using the square root of the sum.

15. The method of claim 1, wherein determining the altitude error value comprises:
   computing a square of the first error value;
   computing an additional product by multiplying the square of the first error value by a term;
   computing a square of the second error value;
   computing a sum by adding the additional product and the square of the second error value;
   computing a square root of the sum; and
   determining the altitude error value to be a result computed by adding the square root of the sum and another term.

16. A method for determining an altitude error value associated with an estimated altitude of a mobile device that resides in an operational environment, the method comprising:
   determining a first error value;
   determining a second error value; and
   determining the altitude error value using the first error value and the second error value,
   wherein determining the second error value is implemented by one or more machines, and wherein determining the second error value comprises:
      receiving a measurement of a local pressure measured by a local pressure sensor of the mobile device;
      receiving a reference pressure value that is based on a measurement of pressure measured by a reference pressure sensor;
      receiving a measurement of a reference temperature measured by a reference temperature sensor;
      receiving a value of measurement error associated with the reference pressure sensor;
      receiving a value of measurement error associated with the local pressure sensor; and
      computing the second error value by:
         computing a first quotient by dividing (i) the value of measurement error associated with the reference pressure sensor by (ii) the reference pressure value;
         computing a square of the first quotient;
         computing a second quotient by dividing (i) the value of measurement error associated with the local pressure sensor by (ii) the measurement of the local pressure;
         computing a square of the second quotient;
         computing a first sum by: (i) adding the square of the first quotient and the square of the second quotient, or (ii) computing a first product by multiplying the square of the first quotient by a first term, computing a second product by multiplying the square of the second quotient by a second term, and adding the first product and the second product;
         computing a third product by multiplying the first sum by a square of the measurement of the reference temperature; and
         computing the second error value using a square root of the third product.

17. The method of claim 16, wherein
the first sum is computed by adding the square of the first quotient and the square of the second quotient.

18. The method of claim 16, wherein the first sum is computed by:
   computing the first product by multiplying the square of the first quotient by the first term, computing the second product by multiplying the square of the second quotient by the second term, and adding the first product and the second product.

19. The method of claim 18, wherein determining the altitude error value comprises:
computing a square of the first error value,
computing a fourth product by multiplying the square of the first error value by a third term,
computing a square of the second error value,
computing a second sum by adding the fourth product and the square of the second error value,
computing a square root of the second sum, and
determining the altitude error value using a third sum computed by adding the square root of the second sum and a fourth term,
wherein the first, second, third and fourth terms are determined by:
computing a first estimated altitude of a first location of the mobile device using a first reference pressure value from the reference pressure sensor, a first measurement of temperature from the reference temperature sensor, and a first measurement of pressure from the local pressure sensor of the mobile device;
identifying a known altitude of the first location;
computing a difference in altitude between the first estimated altitude and the known altitude;
identifying a first value of measurement error of the reference pressure sensor:
identifying a first value of measurement error of the local pressure sensor;
determining values of the first term, the second term, the third term, and the fourth term using the difference in altitude, the first value of measurement error of the reference pressure sensor, and the first value of measurement error of the local pressure sensor.

20. The method of claim 16, wherein determining the altitude error value comprises:
computing a square of the first error value;
computing a square of the second error value;
computing a second sum by adding the square of the first error value and the square of the second error value;
computing a square root of the second sum; and
determining the altitude error value using the square root of the second sum.

21. The method of claim 16, wherein determining the altitude error value comprises:
computing a square of the first error value;
computing a fourth product by multiplying the square of the first error value by a third term;
computing a square of the second error value;
computing a second sum by adding the fourth product and the square of the second error value;
computing a square root of the second sum; and
determining the altitude error value using a third sum computed by adding the square root of the second sum and a fourth term.

22. A method for determining an altitude error value associated with an estimated altitude of a mobile device that resides in an operational environment, the method comprising:
determining a first error value;
determining a second error value; and
determining the altitude error value using the first error value and the second error value,
wherein determining the altitude error value is implemented by one or more machines, and wherein determining the altitude error value comprises:
computing a square of the first error value;
computing a square of the second error value;
computing a sum by adding the square of the first error value and the square of the second error value;
computing a square root of the sum; and
determining the altitude error value using the square root of the sum.

23. A method for determining an altitude error value associated with an estimated altitude of a mobile device that resides in an operational environment, the method comprising:
determining a first error value;
determining a second error value; and
determining the altitude error value using the first error value and the second error value,
wherein determining the altitude error value is implemented by one or more machines, and wherein determining the altitude error value comprises:
computing a square of the first error value;
computing a product by multiplying the square of the first error value by a term;
computing a square of the second error value;
computing a sum by adding the product and the square of the second error value;
computing a square root of the sum; and
determining the altitude error value using a result computed by adding the square root of the sum and another term.

24. One or more non-transitory machine-readable media embodying program instructions that, when executed by one or more machines, cause the one or more machines to implement a method for determining an altitude error value associated with an estimated altitude of a mobile device that resides in an operational environment, the method comprising:
determining a first error value;
determining a second error value; and
determining the altitude error value using the first error value and the second error value,
wherein determining the first error value is implemented by one or more machines, and wherein determining the first error value comprises:
determining an estimated distance between the mobile device and a reference pressure sensor;
determining if weather data specifies weather in the operational environment is a first type of weather;
determining a weather error value; and
using the weather error value to set the first error value,
wherein determining the weather error value comprises:
if a determination is made that the weather data specifies the weather in the operational environment is the first type of weather, determining a product computed by multiplying the estimated distance by a predefined number and determining the weather error value is the determined product;
if a determination is made that the weather data specifies the weather in the operational environment is not the first type of weather and the estimated distance is less than a threshold amount of distance, determining the weather error value is a first predefined error value; and
if a determination is made that the weather data specifies the weather in the operational environment is not the first type of weather and the estimated distance is greater than the threshold amount of distance, determining the weather error value is a second predefined error value.

25. The one or more non-transitory machine-readable media of claim 24, wherein the method comprises: setting the first error value to the weather error value.

26. The one or more non-transitory machine-readable media of claim 24, wherein the method comprises: setting the first error value to a combination of the weather error value and a drift error value related to drift of a local pressure sensor of the mobile device.

27. The one or more non-transitory machine-readable media of claim 24, wherein the method comprises: setting the first error value to a combination of the weather error value and a pressurization error value related to pressurization inside a building that houses the mobile device.

28. The one or more non-transitory machine-readable media of claim 24, wherein the first type of weather is calm weather specified by one or more of: a wind speed measured in the operational environment that does not exceed a predefined threshold amount of wind; a first difference in pressure that does not exceed a first predefined threshold amount of pressure, wherein the first difference in pressure is a difference between two reference pressures estimated for a reference altitude; a second difference in pressure that does not exceed a second predefined threshold amount of pressure, wherein the second difference in pressure is a difference between a first measurement of pressure measured at a first time and a second measurement of pressure measured at a second time; a third difference in pressure that does not exceed the second predefined threshold amount of pressure, wherein the third difference in pressure is a difference between a first reference pressure estimated using the first measurement of pressure and a second reference pressure estimated using the second measurement of pressure; a temperature measured in the operational environment that is not below a historical average temperature value; or precipitation measured in the operational environment that does not exceed a predefined threshold amount of precipitation.

29. The one or more non-transitory machine-readable media of claim 24, wherein determining if the weather data specifies the weather in the operational environment is the first type of weather comprises:
comparing the weather data to predefined parameters of the first weather type;
determining that the weather data specifies the weather in the operational environment is the first type of weather when the weather data and the predefined parameters match; and
determining that the weather data specifies the weather in the operational environment is not the first type of weather when the weather data and the predefined parameters do not match.

30. The one or more non-transitory machine-readable media of claim 24, wherein the product, the first predefined error value, and the second predefined error value are not the same value.

31. The one or more non-transitory machine-readable media of claim 24, wherein determining the second error value comprises:
receiving a measurement of a local pressure measured by a local pressure sensor of the mobile device;
receiving a reference pressure value that is based on a measurement of pressure measured by a reference pressure sensor;
receiving a measurement of a reference temperature measured by a reference temperature sensor;
receiving a value of measurement error associated with the reference pressure sensor;
receiving a value of measurement error associated with the local pressure sensor; and
computing the second error value by:
computing a first quotient by dividing (i) the value of measurement error associated with the reference pressure sensor by (ii) the reference pressure value;
computing a square of the first quotient;
computing a second quotient by dividing (i) the value of measurement error associated with the local pressure sensor by (ii) the measurement of the local pressure;
computing a square of the second quotient;
computing a first sum by: (i) adding the square of the first quotient and the square of the second quotient, or (ii) computing a first product by multiplying the square of the first quotient by a first term, computing a second product by multiplying the square of the second quotient by a second term, and adding the first product and the second product;
computing a third product by multiplying the first sum by a square of the measurement of the reference temperature and a predefined value; and
computing the second error value as a square root of the third product.

32. The one or more non-transitory machine-readable media of claim 31, wherein the first sum is computed by adding the square of the first quotient and the square of the second quotient.

33. The one or more non-transitory machine-readable media of claim 31, wherein the first sum is computed by: computing the first product by multiplying the square of the first quotient by the first term, computing the second product by multiplying the square of the second quotient by the second term, and adding the first product and the second product.

34. The one or more non-transitory machine-readable media of claim 33, wherein determining the altitude error value comprises:
computing a square of the first error value,
computing a fourth product by multiplying the square of the first error value by a third term,
computing a square of the second error value,
computing a second sum by adding the fourth product and the square of the second error value,
computing a square root of the second sum, and
determining the altitude error value using a third sum computed by adding the square root of the second sum and a fourth term,
wherein the first, second, third and fourth terms are determined by:
computing a first estimated altitude of a first location of the mobile device using a first reference pressure value from the reference pressure sensor, a first measurement of temperature from the reference temperature sensor, and a first measurement of pressure from the local pressure sensor of the mobile device;
identifying a known altitude of the first location;
computing a difference in altitude between the first estimated altitude and the known altitude;
identifying a first value of measurement error of the reference pressure sensor;
identifying a first value of measurement error of the local pressure sensor;
determining values of the first term, the second term, the third term, and the fourth term using the difference in altitude, the first value of measurement error of the reference pressure sensor, and the first value of measurement error of the local pressure sensor.

35. The one or more non-transitory machine-readable media of claim 31, wherein determining the altitude error value comprises:
computing a square of the first error value;
computing a square of the second error value;
computing a second sum by adding the square of the first error value and the square of the second error value;
computing a square root of the second sum; and
determining the altitude error value using the square root of the second sum.

36. The one or more non-transitory machine-readable media of claim 31, wherein determining the altitude error value comprises:
computing a square of the first error value;
computing a fourth product by multiplying the square of the first error value by a third term;
computing a square of the second error value;
computing a second sum by adding the fourth product and the square of the second error value;
computing a square root of the second sum; and
determining the altitude error value using a third sum computed by adding the square root of the second sum and a fourth term.

37. The one or more non-transitory machine-readable media of claim 24, wherein determining the altitude error value comprises:
computing a square of the first error value;
computing a square of the second error value;
computing a sum by adding the square of the first error value and the square of the second error value;
computing a square root of the sum; and
determining the altitude error value using the square root of the sum.

38. The one or more non-transitory machine-readable media of claim 24, wherein determining the altitude error value comprises:
computing a square of the first error value;
computing an additional product by multiplying the square of the first error value by a term;
computing a square of the second error value;
computing a sum by adding the additional product and the square of the second error value;
computing a square root of the sum; and
determining the altitude error value to be a result computed by adding the square root of the sum and another term.

39. One or more non-transitory machine-readable media embodying program instructions that, when executed by one or more machines, cause the one or more machines to implement a method for determining an altitude error value associated with an estimated altitude of a mobile device that resides in an operational environment, the method comprising:
determining a first error value;
determining a second error value; and
determining the altitude error value using the first error value and the second error value,
wherein determining the second error value is implemented by one or more machines, and wherein determining the second error value comprises:
receiving a measurement of a local pressure measured by a local pressure sensor of the mobile device;
receiving a reference pressure value that is based on a measurement of pressure measured by a reference pressure sensor;
receiving a measurement of a reference temperature measured by a reference temperature sensor;
receiving a value of measurement error associated with the reference pressure sensor;
receiving a value of measurement error associated with the local pressure sensor; and
computing the second error value by:
computing a first quotient by dividing (i) the value of measurement error associated with the reference pressure sensor by (ii) the reference pressure value;
computing a square of the first quotient;
computing a second quotient by dividing (i) the value of measurement error associated with the local pressure sensor by (ii) the measurement of the local pressure;
computing a square of the second quotient;
computing a first sum by: (i) adding the square of the first quotient and the square of the second quotient, or (ii) computing a first product by multiplying the square of the first quotient by a first term, computing a second product by multiplying the square of the second quotient by a second term, and adding the first product and the second product;
computing a third product by multiplying the first sum by a square of the measurement of the reference temperature; and
computing the second error value using a square root of the third product.

40. The one or more non-transitory machine-readable media of claim 39, wherein the first sum is computed by adding the square of the first quotient and the square of the second quotient.

41. The one or more non-transitory machine-readable media of claim 39, wherein the first sum is computed by: computing the first product by multiplying the square of the first quotient by the first term, computing the second product by multiplying the square of the second quotient by the second term, and adding the first product and the second product.

42. The one or more non-transitory machine-readable media of claim 41, wherein determining the altitude error value comprises:
computing a square of the first error value, computing a fourth product by multiplying the square of the first error value by a third term,
computing a square of the second error value,
computing a second sum by adding the fourth product and the square of the second error value,
computing a square root of the second sum, and
determining the altitude error value using a third sum computed by adding the square root of the second sum and a fourth term,
wherein the first, second, third and fourth terms are determined by:
computing a first estimated altitude of a first location of the mobile device using a first reference pressure value from the reference pressure sensor, a first measurement of temperature from the reference temperature sensor, and a first measurement of pressure from the local pressure sensor of the mobile device;
identifying a known altitude of the first location;
computing a difference in altitude between the first estimated altitude and the known altitude;
identifying a first value of measurement error of the reference pressure sensor;

identifying a first value of measurement error of the local pressure sensor;

determining values of the first term, the second term, the third term, and the fourth term using the difference in altitude, the first value of measurement error of the reference pressure sensor, and the first value of measurement error of the local pressure sensor.

43. The one or more non-transitory machine-readable media of claim 39, wherein determining the altitude error value comprises:
   computing a square of the first error value;
   computing a square of the second error value;
   computing a second sum by adding the square of the first error value and the square of the second error value;
   computing a square root of the second sum; and
   determining the altitude error value using the square root of the second sum.

44. The one or more non-transitory machine-readable media of claim 39, wherein determining the altitude error value comprises:
   computing a square of the first error value;
   computing a fourth product by multiplying the square of the first error value by a third term;
   computing a square of the second error value;
   computing a second sum by adding the fourth product and the square of the second error value;
   computing a square root of the second sum; and
   determining the altitude error value using a third sum computed by adding the square root of the second sum and a fourth term.

45. One or more non-transitory machine-readable media embodying program instructions that, when executed by one or more machines, cause the one or more machines to implement a method for determining an altitude error value associated with an estimated altitude of a mobile device that resides in an operational environment, the method comprising:
   determining a first error value;
   determining a second error value; and
   determining the altitude error value using the first error value and the second error value,
   wherein determining the altitude error value is implemented by one or more machines, and wherein determining the altitude error value comprises:
   computing a square of the first error value;
   computing a square of the second error value;
   computing a sum by adding the square of the first error value and the square of the second error value;
   computing a square root of the sum; and
   determining the altitude error value using the square root of the sum.

46. One or more non-transitory machine-readable media embodying program instructions that, when executed by one or more machines, cause the one or more machines to implement a method for determining an altitude error value associated with an estimated altitude of a mobile device that resides in an operational environment, the method comprising:
   determining a first error value;
   determining a second error value; and
   determining the altitude error value using the first error value and the second error value,
   wherein determining the altitude error value is implemented by one or more machines, and wherein determining the altitude error value comprises:
   computing a square of the first error value;
   computing a product by multiplying the square of the first error value by a term;
   computing a square of the second error value;
   computing a sum by adding the product and the square of the second error value;
   computing a square root of the sum; and
   determining the altitude error value using a result computed by adding the square root of the sum and another term.

* * * * *